(12) United States Patent
Jahani et al.

(10) Patent No.: US 10,949,747 B1
(45) Date of Patent: Mar. 16, 2021

(54) DEEP LEARNING MODEL TRAINING SYSTEM

(71) Applicant: SAS Institute Inc., Cary, NC (US)

(72) Inventors: Majid Jahani, Bethlehem, PA (US); Joshua David Griffin, Harrisburg, NC (US); Seyedalireza Yektamaram, Amsterdam (NL); Wenwen Zhou, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/950,145

(22) Filed: Nov. 17, 2020

Related U.S. Application Data

(60) Provisional application No. 63/011,125, filed on Apr. 16, 2020.

(51) Int. Cl.
G06N 5/04 (2006.01)
G06N 3/08 (2006.01)
G06F 17/16 (2006.01)
G06K 9/62 (2006.01)
G06N 20/10 (2019.01)

(52) U.S. Cl.
CPC .............. *G06N 3/084* (2013.01); *G06F 17/16* (2013.01); *G06K 9/6228* (2013.01); *G06N 5/046* (2013.01); *G06N 20/10* (2019.01)

(58) Field of Classification Search
CPC ..................................................... G06N 3/084
USPC ..................................................... 706/15, 45
See application file for complete search history.

(56) References Cited

U.S. PATENT DOCUMENTS

| 10,769,528 B1 | 9/2020 | Wang et al. |
| 2018/0075347 A1* | 3/2018 | Alistarh ................. G06N 3/084 |
| 2020/0159589 A1* | 5/2020 | Capes ................ G06K 9/00993 |

OTHER PUBLICATIONS

Berahas, A., Jahani, M., and Tak'aj c, M. Quasi-newton methods for deep learning: Forget the past, just sample. arXiv preprint arXiv:1901.09997, 2019.

Erway, J., Griffin, J., Marcia, R., and Omheni, R. Trust-region algorithms for training responses: machine learning methods using indefinite hessian approximations. Optimization Methods and Software, pp. 1-28, 2019.

(Continued)

*Primary Examiner* — David R Vincent
(74) *Attorney, Agent, or Firm* — Bell & Manning, LLC

(57) ABSTRACT

A computer trains a neural network model. (A) Observation vectors are randomly selected from a plurality of observation vectors. (B) A forward and backward propagation of a neural network is executed to compute a gradient vector and a weight vector. (C) A search direction vector is computed. (D) A step size value is computed. (E) An updated weight vector is computed. (F) Based on a predefined progress check frequency value, second observation vectors are randomly selected, a progress check objective function value is computed given the weight vector, the step size value, the search direction vector, and the second observation vectors, and based on an accuracy test, the mini-batch size value is updated. (G) (A) to (F) are repeated until a convergence parameter value indicates training of the neural network is complete. The weight vector for a next iteration is the computed updated weight vector.

30 Claims, 18 Drawing Sheets

(56) References Cited

OTHER PUBLICATIONS

Anonymous Authors, "A mini-batch stochastic quasi-Newton method adapted for nonconvex deep learning problems," 2020 ICML.
Wikipedia, Backtracking line search, retrieved from https://en.wikipedia.org/w/index.php?title=Backtracking_line_search&oldid=960063023, last edited May 31, 2020.
Brust, J., Erway, J.B. & Marcia, R.F. On solving L-SR1 trust-region subproblems. Comput Optim Appl 66, 245-266 (2017). https://doi.org/10.1007/s10589-016-9868-3.
SAS Visual Data Mining and Machine Learning 8.2: Deep Learning Programming Guide, SAS Institute Inc., 2017.
Erway et al., "Trust Region Optimization Methods Using Limited-Memory Symmetric Rank-One Updates for Off-the-Shelf Machine Learning," Technical Report 2017, Department of Mathematics and Statistics, Wake Forest University.
Wang et al., "An Efficient Stochastic L-BFGS Method for Deep Learning," SAS Paper IEEE, 2017.
A. Krizhevsky, et al., Learning multiple layers of features from tiny images, TR-2009 University of Toronto (2009).
Ramamurphy et al., "L-SR1: A Second Order Optimization Method for Deep Learning," ICLR Conference Paper 2017.
Nocedal et al., "Springer Series in Operations Research," Numerical Optimization, 2006 Spring Science.
Jacob Ratati, "Improving L-BFGS Initialization for Trust-Region Methods in Deep Learning," 2018 ICMLA Slides.
Schraudolph et al., "A Stochastic, Quasi-Newton Method for Online Convex Optimization," Artificial intelligence and statistics, 2007—jmlr.org.
Wikipedia, Symmetric Rank-One, retrieved from https://en.wikipedia.org/w/index.php?title=Symmetric_rank-one&oldid=940160167, last edited on Feb. 10, 2020.
Conn, A., Gould, N., and Toint, P. Trust-Region Methods. Society for Industrial and Applied Mathematics (SIAM), Philadelphia, PA, 2000. ISBN 0-89871-460-5, book, title page information.
LeCun et al., Gradient based learning applied to document recognition, Proceedings of the IEEE 86(11):2278-2324 (1998).
A. S. Berahas, et al, "A multi-batch L-BFGS method for machine learning," Advances in Neural Information Processing Systems, vol. 29, pp. 1055-1063, 2016.
L. Bottou, F. E. Curtis, and J. Nocedal. (2017) Optimization methods for large-scale machine learning. [Online]. Available: https://arxiv.org/pdf/1606.04838.pdf.
R. Johnson and T. Zhang, "Accelerating stochastic gradient descent using predictive variance reduction," in NIPS, 2013.
P. Moritz, R. Nishihara, and M. I. Jordan, "A linearly-convergent stochastic L-BFGS algorithm," in AISTATS, 2016.
R. Zhao, W. B. Haskell, and V. Y. F. Tan, "Stochastic L-BFGS revisited: Improved convergence rates and practical acceleration strategies," CoRR, vol. abs/1704.00116, 2017.
M. Mahsereci and P. Hennig, "Probabilistic line searches for stochastic optimization," Journal of Machine Learning Research, vol. 18, pp. 1-59, 2017.

\* cited by examiner

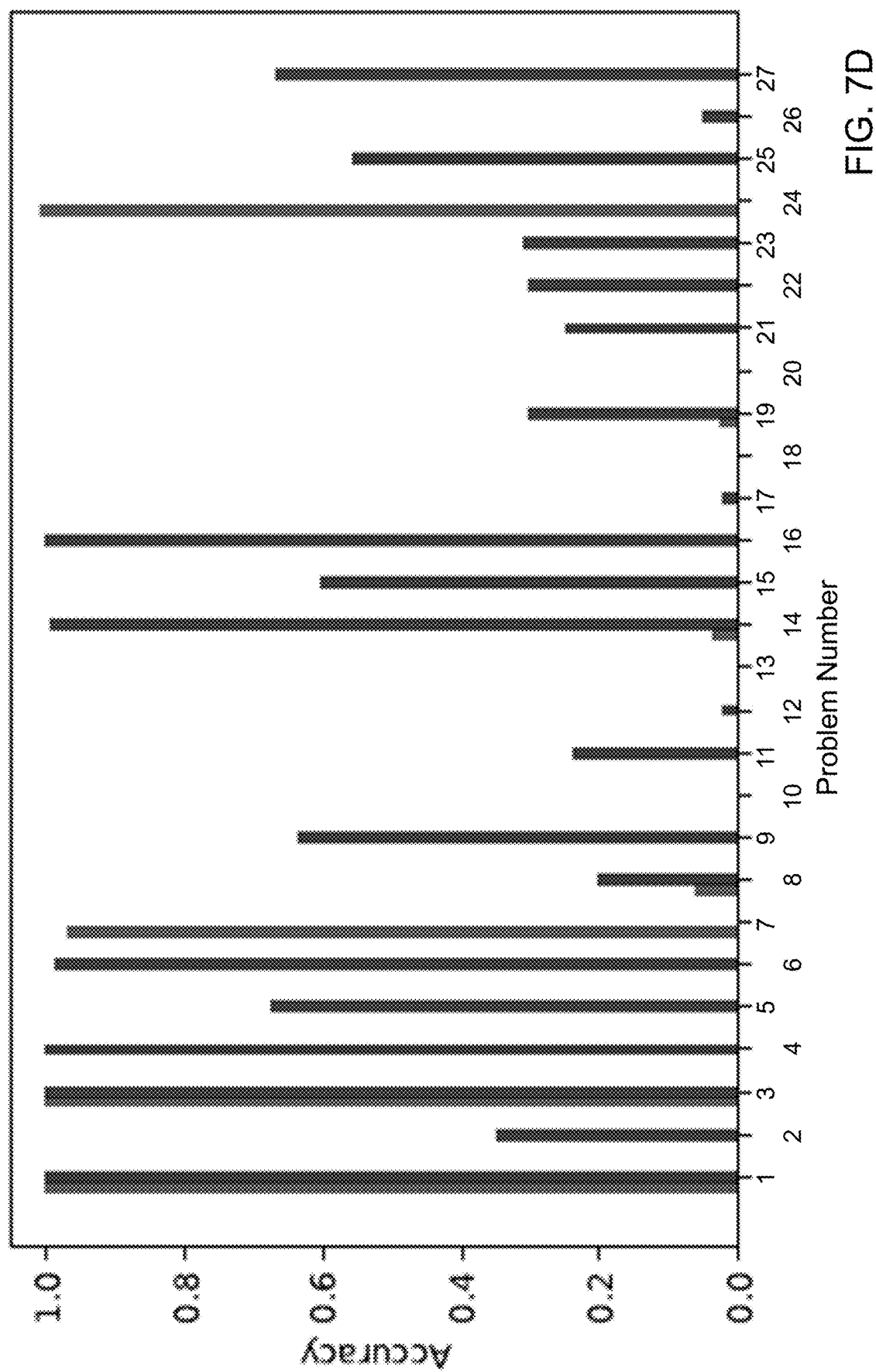

US 10,949,747 B1

DEEP LEARNING MODEL TRAINING SYSTEM

CROSS-REFERENCE TO RELATED APPLICATIONS

The present application claims the benefit of and priority to 35 U.S.C. § 119(e) to U.S. Provisional Patent Application No. 63/011,125 filed Apr. 16, 2020, the entire contents of which are hereby incorporated by reference.

BACKGROUND

For training deep learning models, stochastic gradient descent (SGD) is the most widely used optimization method though it can be very sensitive to hyperparameter values and is not straightforward to parallelize. Choosing the proper hyperparameters can require tuning procedures that result in high computation power consumption. SGD variants, such as ADAM-SGD and Momentum-SGD, have been proposed to improve SGD performance. Though these variants can be more efficient and more robust, tuning their hyperparameters remains a daunting task. As a type of quasi-Newton method, the limited memory Broyden-Fletcher-Goldfarb-Shanno algorithm (L-BFGS) generally requires fewer iterations to converge, requires much less hyperparameter tuning, and is naturally parallelizable. Though there has been some progress recently in using stochastic L-BFGS for machine learning, stochastic L-BFGS overall may not be as efficient as SGD for deep learning. It may require a long training time due to an inaccuracy of a positive-definite approximation that makes updates less effective, and may produce large errors.

SUMMARY

In an example embodiment, a computer-readable medium is provided having stored thereon computer-readable instructions that when executed by a computing device, cause the computing device to train a neural network model. (A) Observation vectors are randomly selected from a plurality of observation vectors. A number of observation vectors selected is a mini-batch size value. (B) A forward and backward propagation of a neural network is executed to compute a gradient vector and a weight vector using the selected observation vectors. The neural network includes a layer type for each layer of a plurality of neural network layers. (C) A search direction vector is computed using the gradient vector. (D) A step size value is computed using a line search with an objective function value that indicates an error measure of the executed neural network given the weight vector, the step size value, and the computed search direction vector. (E) An updated weight vector is computed as a function of the weight vector, the computed step size value, and the computed search direction vector. (F) Based on a predefined progress check frequency value, second observation vectors are randomly selected from the plurality of observation vectors, a progress check objective function value is computed given the weight vector, the step size value, the computed search direction vector, and the randomly selected second observation vectors, and based on an accuracy test performed using the objective function value and the computed progress check objective function value, the mini-batch size value is updated. (G) (A) to (F) are repeated until a convergence parameter value indicates training of the neural network is complete. The weight vector for a next iteration is the computed updated weight vector. The computed updated weight vector output to describe a trained neural network model.

In another example embodiment, a computing device is provided. The computing device includes, but is not limited to, a processor and a computer-readable medium operably coupled to the processor. The computer-readable medium has instructions stored thereon that, when executed by the processor, cause the computing device to train a neural network model.

In yet another example embodiment, a method of training a neural network model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 7C, 7D, 7E, and 7F provide comparative training accuracy results computed using the neural network model training application and SGD for the 27 different imbalanced dataset problems in accordance with an illustrative embodiment.

DETAILED DESCRIPTION

Neural networks are a class of machine learning models that consist of one or more transformation layers. Loosely speaking, each layer i with $d_i$ inputs and $h_i$ outputs. If not, please defined them consists of a set of weights denoted by the matrix $W_i \in \mathbb{R}^{h_i \times d_i}$ a set of input $x_i \in \mathbb{R}^{d_i}$ (neurons), and a bias term $\beta_i \in \mathbb{R}^{h_i}$. The corresponding output of the layer is itself a set of neurons $a_i(x_i) \in \mathbb{R}^{h_i}$ defined by the transformation:

$$a_i(x_i) = \sigma(W_i x_i + \beta_i),$$

where σ denotes a corresponding activation function. If there are l layers, the union of the set of parameters $\cup\{W_i, \beta_i\}_{i=1}^l$, becomes the corresponding optimization variables or parameters. For simplicity, a map from this set to a weight vector $w \in \mathbb{R}^d$ is assumed, where d corresponds to a total number of variables across all layers. Henceforth, all notation is with respect to the weight vector w.

Deep learning models are a class of neural networks consisting of many layers. As in other machine learning approaches, in deep learning, an objective function is minimized $$\min_{w \in \mathbb{R}^d} f(w) = \frac{1}{N} \sum_{i=1}^N f_i(w),$$

where each objective function $f_i(w)$ provides a measure of accuracy for the deep learning model applied to the $i^{th}$ observation in training dataset 124 which includes N observations. For loss functions such as those arising in deep-learning models, $f(w)$ may be nonconvex while both d and N may be arbitrarily large.

Figure 1:
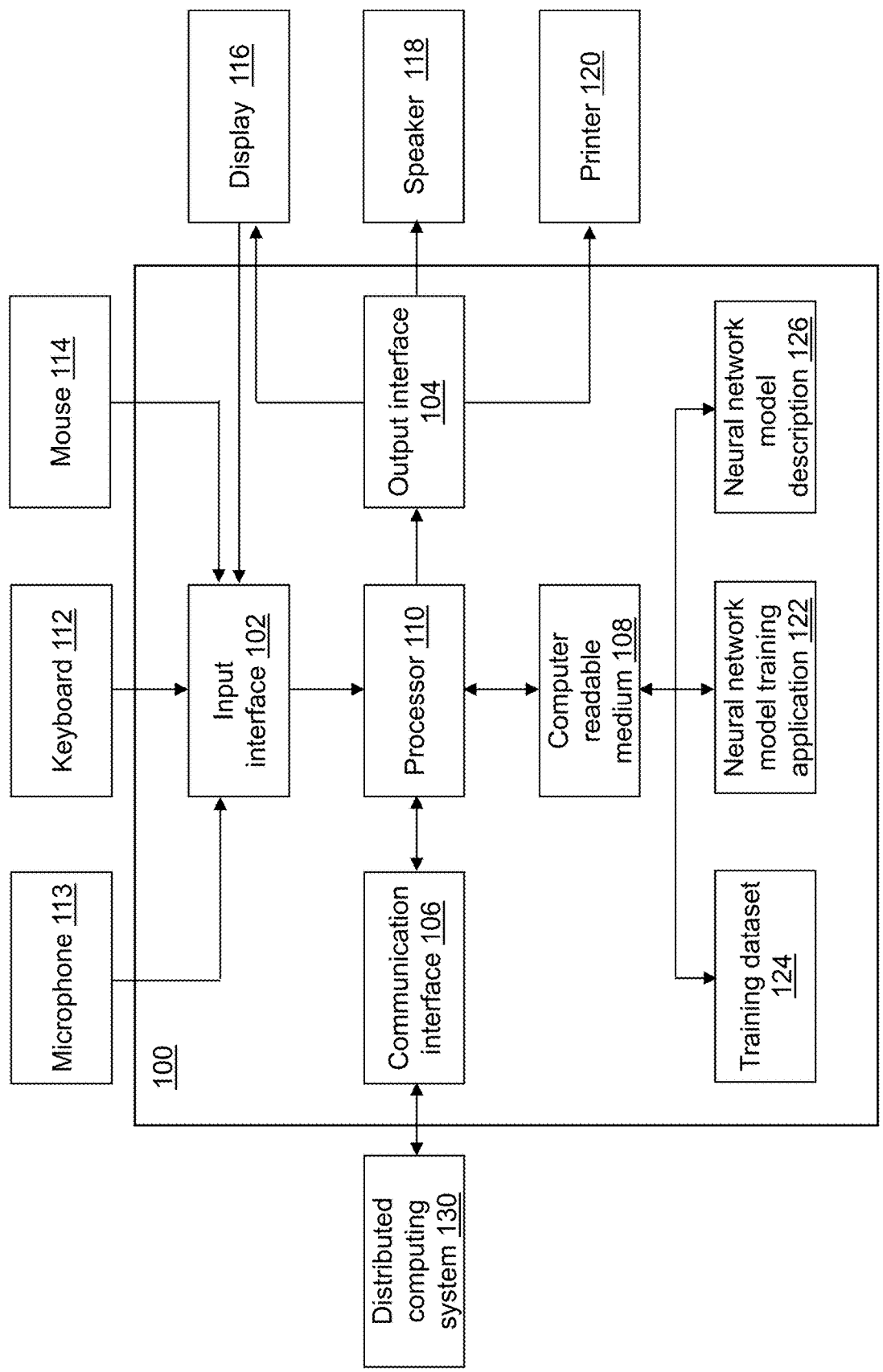
FIG. 1 depicts a block diagram of a neural network model training device in accordance with an illustrative embodiment.

Referring to FIG. 1, a block diagram of a neural network model training device 100 is shown in accordance with an illustrative embodiment. Neural network model training device 100 may include an input interface 102, an output interface 104, a communication interface 106, a non-transitory computer-readable medium 108, a processor 110, a neural network model training application 122, training dataset 124, and a neural network model description 126. Fewer, different, and/or additional components may be incorporated into neural network model training device 100.

Machine learning (ML) training objectives may be posed as highly nonlinear and nonconvex unconstrained optimization problems. Methods for solving ML problems based on stochastic gradient descent (SGD) are easily scaled for very large problems but may involve fine-tuning many hyperparameters. Quasi-Newton approaches based on the limited-memory Broyden-Fletcher-Goldfarb-Shanno (L-BFGS) update typically do not require manually tuning hyperparameters but suffer from approximating a potentially indefinite Hessian with a positive definite matrix. Hessian-free methods leverage the ability to perform Hessian vector multiplication without needing the entire Hessian matrix, but each iteration's complexity is significantly greater than quasi-Newton methods. An alternative approach for solving ML problems based on a quasi-Newton trust-region framework for solving large-scale optimization problems that allow for indefinite Hessian approximations is described in a paper by Erway, J., et al., *Trust region algorithms for training responses: machine learning methods using indefinite hessian approximations* Optimization Methods and Software, 1-28 (May 23, 2019) (L-SSR1-TR).

Modern machine learning approaches consist predominantly of variants and off-shoots of SGD methods. In general, SGD updates have the form $$w_{k+1} = w_k - \alpha_k D_k g_{\mathcal{J}}(w_k)$$

where $w_k$ denotes current weights, $\alpha_k$ a step-size or learning rate, $D_k$ a diagonal approximation to an inverse Hessian, $\mathcal{J}$ a current mini-batch, and $g_{\mathcal{J}}(w_k)$ a gradient vector defined by $$g_{\mathcal{J}}(w_k) = \frac{1}{|\mathcal{J}|} \sum_{i \in \mathcal{J}} \nabla f_i(w_k)$$

where $|\mathcal{J}|$ indicates a number of observations included in the current mini-batch.

Regardless of the SGD variant, it has been observed that well-tuned SGD methods are highly effective at training large deep learning models with huge input datasets across diverse applications including image classification, object detection, machine translation, etc. SGD uses the first derivative of the objective function to decide the search direction. The step size is generally determined by pre-defined learning rate policies. Since the computation requirement of SGD is low, SGD is able to scale to train large models. The simplicity and scalability of SGD come with a cost though. SGD often requires extensive hyperparameter tuning to be effective, which increases the training time.

Because of this, quasi-Newton methods are attractive in that they build and exploit second-order information in the background using the same inputs as SGD and nominal additional computational logistics. A popular existing quasi-Newton update strategy is L-BFGS. At each iteration, L-BFGS uses gradients to approximate an inverse Hessian matrix and to compute the search direction and step size. Compared to SGD, L-BFGS requires fewer iterations to converge and usually needs minimal hyperparameter tuning. With fewer iterations, parallel computing time can be reduced as less communication is required between the nodes, which seems to be the important factor when using distributed grids for training. However, L-BFGS is more expensive per iteration and tends to take longer to converge as it may give an inaccurate approximation for a nonconvex problem.

For a deterministic optimization problem, a second-order method can achieve a faster convergence rate compared to a first-order method. Requiring fewer iterations, second-order methods can better take advantage of parallel computing because they incur lower communication costs by decreasing the number of total iterations due to generation of more powerful update directions. Second-order approaches can be divided into at least three categories: (I) methods that make use of derivative information in the form of Hessian-vector multiplications, (II) methods that use of a block-diagonal matrix called K-FAC to approximate the Hessian matrix, and (III) methods that use gradients to gradually buildup second-order information called limited memory quasi-Newton updates.

The methods of category (I) require explicit second-order (directional) derivative calculations. As a result, their applications are limited to platforms that support efficient second-order automatic differentiation. The methods of category (II), are highly structure intensive and cannot be surfaced as an out of the box solver plugin for machine learning packages. In other words, for such approaches, efficiency and applicability are tightly coupled with the ML framework package.

The methods of category (III) use quasi-Newton updates with limited memory to shape the Hessian approximation using secant approximations for gradually building a curvature approximation. An advantage of the quasi-Newton approach is that, unlike the higher-order alternatives, the inputs needed for such approaches are identical to that of SGD.

A framework for limited memory quasi-Newton updates is very similar to SGD updates, requiring similar inputs, where a Tikhonov-damped quasi-Newton approximation $D_k$ is defined by $D_k = (B_k + \sigma_k I)^{-1}$, where $\sigma_k$ indicates an optimal dual multiplier of a trust-region subproblem, $B_k$ indicates a quasi-Newton Hessian approximation, and I indicates an identity matrix. The learning-rate may be selected adaptively by a line-search to ensure each mini-batch achieves an amount of overall reduction.

BFGS maintains a positive-definite $B_k$, and the target Hessian is positive semi-definite. As a result, BFGS often works well in practice. However, applying L-BFGS has the potential for poor convergence of the updates, and the updates can become near singular due to non-positive definiteness of the actual Hessian. Additionally, enforcing a curvature condition for BFGS can be computationally expensive for a nonconvex problem.

Neural network model training application 122 may include a trust-region radius update for a stochastic learning scenario, a mini-batch size adjustment to avoid evaluating function value on the entire training dataset, and a limited memory symmetric rank-1 (L-SR1) restart when a local model accuracy diverges from an underlying true function. Particularly in scenarios where a large mini-batch size is required (e.g. distributed computing and imbalanced datasets), neural network model training application 122 provides significantly better results compared to a well-tuned SGD.

Input interface 102 provides an interface for receiving information from the user or another device for entry into neural network model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into neural network model training device 100 or to make selections presented in a user interface displayed on display 116.

The same interface may support both input interface 102 and output interface 104. For example, display 116 comprising a touch screen provides a mechanism for user input and for presentation of output to the user. Neural network model training device 100 may have one or more input interfaces that use the same or a different input interface technology. The input interface technology further may be accessible by neural network model training device 100 through communication interface 106.

Output interface 104 provides an interface for outputting information for review by a user of neural network model training device 100 and/or for use by another application or device. For example, output interface 104 may interface with various output technologies including, but not limited to, display 116, a speaker 118, a printer 120, etc. Neural network model training device 100 may have one or more output interfaces that use the same or a different output interface technology. The output interface technology further may be accessible by neural network model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Neural network model training device 100 may have one or more communication interfaces that use the same or a different communication interface technology. For example, neural network model training device 100 may support communication using an Ethernet port, a Bluetooth antenna, a telephone jack, a USB port, etc. Data and/or messages may be transferred between neural network model training device 100 and another computing device of a distributed computing system 130 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Neural network model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Neural network model training device 100 also may have one or more drives that support the loading of a memory media such as a CD, DVD, an external hard drive, etc. One or more external hard drives further may be connected to neural network model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Neural network model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit (GPU), an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Neural network model training application 122 performs operations associated with defining neural network model description 126 from data stored in training dataset 124.

Figure 4:
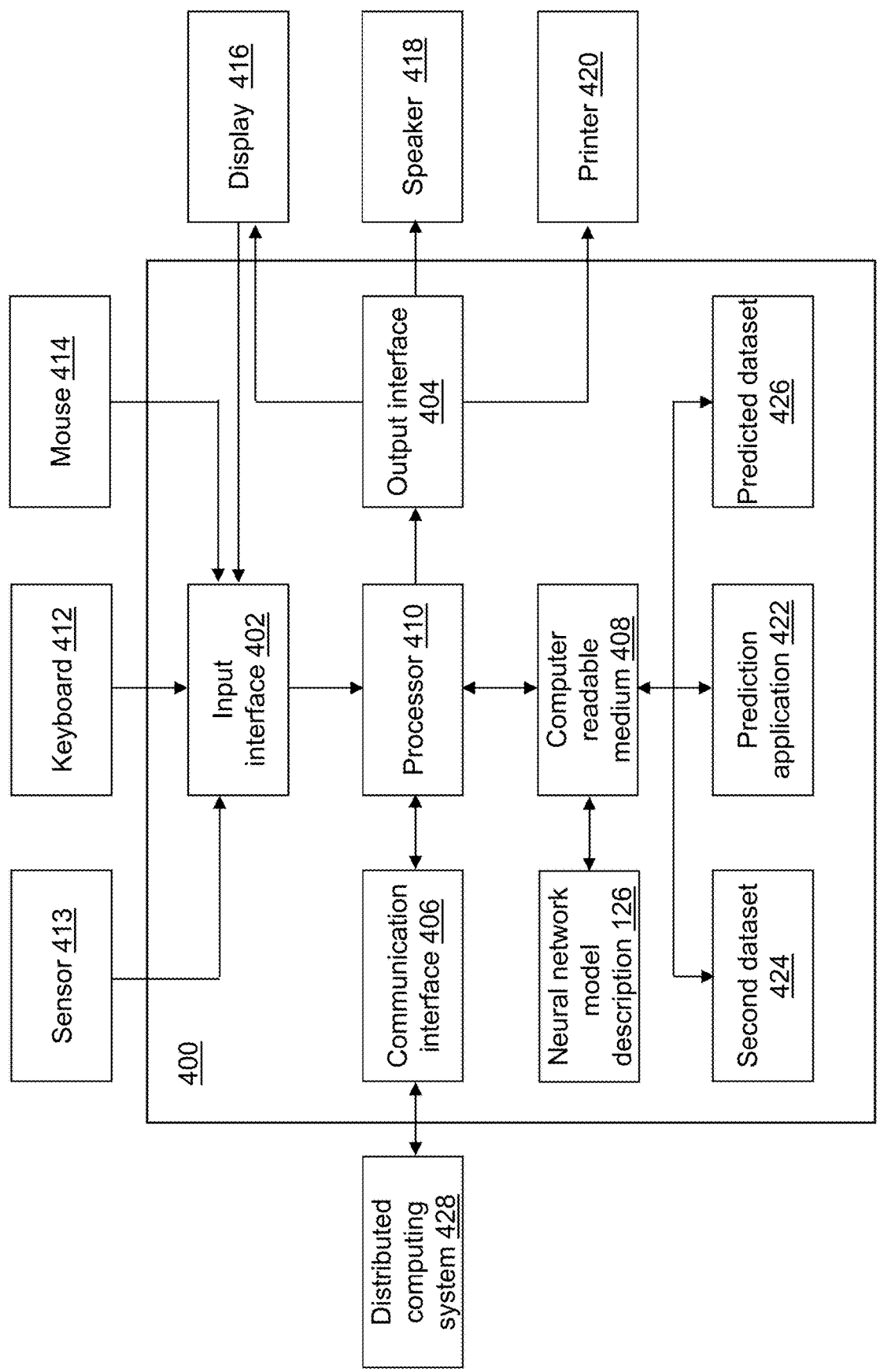
FIG. 4 depicts a block diagram of a prediction device in accordance with an illustrative embodiment.

Neural network model description 126 may be used to predict a characteristic value for data stored training dataset 124 or in a second dataset 424 (shown referring to FIG. 4). The characteristic value may include one or more values that may be a probability that the associated observation vector has a predefined characteristic associated with each probability. Some or all of the operations described herein may be embodied in neural network model training application 122. The operations may be implemented using hardware, firmware, software, or any combination of these methods.

Referring to the example embodiment of FIG. 1, neural network model training application 122 is implemented in software (comprised of computer-readable and/or computer-executable instructions) stored in computer-readable medium 108 and accessible by processor 110 for execution of the instructions that embody the operations of neural network model training application 122. Neural network model training application 122 may be written using one or more programming languages, assembly languages, scripting languages, etc. Neural network model training application 122 may be integrated with other analytic tools. As an example, neural network model training application 122 may be part of an integrated data analytics software application and/or software architecture such as that offered by SAS Institute Inc. of Cary, N.C., USA. Merely for illustration, neural network model training application 122 may be implemented using or integrated with one or more SAS software tools such as JMP®, Base SAS, SAS® Enterprise Miner™ SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Neural network model training application 122 may be implemented as a Web application. For example, neural network model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Training dataset 124 may include, for example, a plurality of rows and a plurality of columns. The plurality of rows may be referred to as observation vectors or records (observations), and the columns may be referred to as variables. In an alternative embodiment, training dataset 124 may be transposed. The plurality of variables defines a vector $x_i$ for each observation vector $i=1, 2, \ldots, N$, where N is a number of the observation vectors included in training dataset 124. Training dataset 124 may include additional variables that are not included in the plurality of variables. One or more variables of the plurality of variables may describe a characteristic of a physical object. For example, if training dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in training dataset 124 for analysis and processing or streamed to neural network model training device 100 as it is generated. Training dataset 124 may include data captured as a function of time for one or more physical objects. The data stored in training dataset 124 may be captured at different time points periodically, intermittently, when an event occurs, etc. Training dataset 124 may include data captured at a high data rate such as 200 or more observation vectors per second for one or more physical objects. One or more columns of training dataset 124 may include a time and/or date value. Training dataset 124 may include data captured under normal and abnormal operating conditions of the physical object.

The data stored in training dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in training dataset 124 may be generated as part of the Internet of Things (IoT), where things (e.g., machines, devices, phones, sensors) can be connected to networks and the data from these things collected and processed within the things and/or external to the things before being stored in training dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in training dataset 124.

The data stored in training dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Training dataset 124 may be stored on computer-readable medium 108 or on one or more computer-readable media of distributed computing system 130 and accessed by neural network model training device 100 using communication interface 106, input interface 102, and/or output interface 104. Training dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Training dataset 124 may be stored using various data structures as known to those skilled in the art including one or more files of a file system, a relational database, one or more tables of a system of tables, a structured query language database, etc. on neural network model training device 100 or on distributed computing system 130. Neural network model training device 100 may coordinate access to training dataset 124 that is distributed across distributed computing system 130 that may include one or more computing devices. For example, training dataset 124 may be stored in a cube distributed across a grid of computers as understood by a person of skill in the art. As another example, training dataset 124 may be stored in a multi-node Hadoop® cluster. For instance, Apache™ Hadoop® is an open-source software framework for distributed computing supported by the Apache Software Foundation. As another example, training dataset 124 may be stored in a cloud of computers and accessed using cloud computing technologies, as understood by a person of skill in the art. The SAS® LASR™ Analytic Server may be used as an analytic platform to enable multiple users to concurrently access data stored in training dataset 124. The SAS Viya open, cloud-ready, in-memory architecture also may be used as an analytic platform to enable multiple users to concurrently access data stored in training dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Referring to FIGS. 2A to 2D, example operations associated with neural network model training application 122 are described. Additional, fewer, or different operations may be performed depending on the embodiment of neural network model training application 122. The order of presentation of the operations of FIGS. 2A to 2D is not intended to be limiting. Some of the operations may not be performed in some embodiments. Although some of the operational flows are presented in sequence, the various operations may be performed in various repetitions and/or in other orders than those that are illustrated. For example, a user may execute neural network model training application 122, which causes presentation of a first user interface window, which may include a plurality of menus and selectors such as drop-down menus, buttons, text boxes, hyperlinks, etc. associated with neural network model training application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by neural network model training application 122. The operations of neural network model training application 122 further may be performed in parallel using a plurality of threads and/or a plurality of worker computing devices.

Figure 2A:
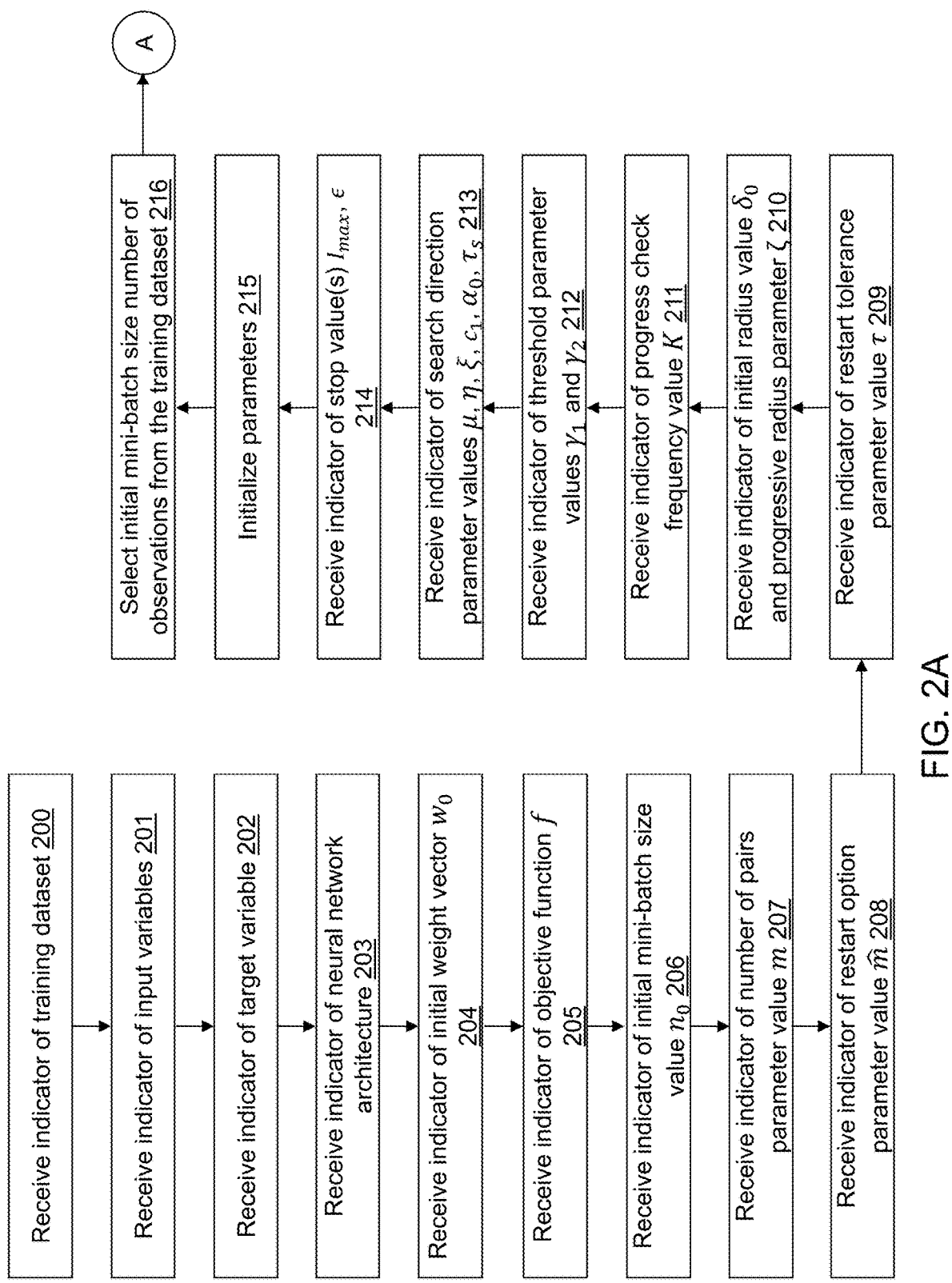
FIGS. 2A through 2D depict a flow diagram illustrating examples of operations performed by a neural network model training application of the neural network model training device of FIG. 1 in accordance with an illustrative embodiment.

Referring to FIG. 2A, in an operation 200, a first indicator may be received that indicates training dataset 124. For example, the first indicator indicates a location and a name of training dataset 124. As an example, the first indicator may be received by neural network model training application 122 after selection from a user interface window or after entry by a user into a user interface window. In an alternative embodiment, training dataset 124 may not be selectable. For example, a most recently created dataset may be used automatically.

In an operation 201, a second indicator may be received that indicates a plurality of variables or features to include in training a neural network model using training dataset 124. For example, the second indicator may indicate a plurality of column numbers or a plurality of column names. As another option, all of the columns except a last column may be used by default. Each observation vector $x_i$, $i=1, \ldots, d$ read from training dataset 124 may include a value for each variable of the plurality of variables to defined dimensions or features. Training dataset 124 includes a set of observation vectors $X=[x_{j,i}]$, $i=1, \ldots, d$, $j=1, \ldots, N$. When a value for a variable of the plurality of variables is missing, the observation vector may not be included in the number of observation vectors N, a value may be computed for the missing variable, for example, based on neighbor values, etc. Training dataset 124 may be partitioned or otherwise divided into training, validation, and/or test datasets as part of training a neural network model.

In an operation 202, a third indicator may be received that indicates a target variable (column) associated with each observation vector included in training dataset 124 to define a target variable vector $y_i$, $i=1, \ldots, N$. The target variable may be a label for the associated observation vector. For example, the label may indicate a characteristic determined about the observation vector. For example, the third indicator indicates a variable to use by name, column number, etc. In an alternative embodiment, the third indicator may not be received. For example, the last variable in training dataset 124 may be used automatically as the target variable vector $y_i$.

In an operation 203, a fourth indicator indicates an architecture of the neural network model to be trained to predict a value for the target variable. The fourth indicator may be received by neural network model training application 122 from a user interface window or after entry by a user into a user interface window. A default value for the architecture may further be stored, for example, in computer-readable medium 108. For illustration, the architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, and/or a recurrent neural network. An automatic tuning method (autotune option) may be specified with one or more values or ranges of values to evaluate for each hyperparameter. The automatic tuning process may be used to identify the best settings for the hyperparameters though the hyperparameters may optionally be selected as an input option by a user.

Figure 3:
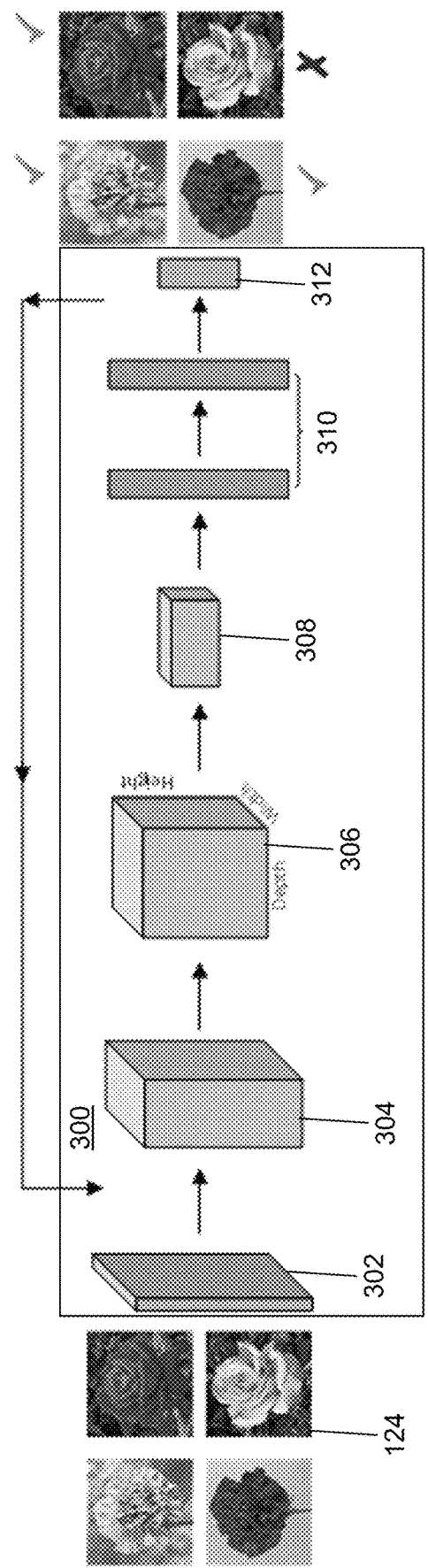
FIG. 3 depicts an illustrative neural network training process in accordance with an illustrative embodiment.

Referring to FIG. 3, an architecture 300 is shown in accordance with an illustrative embodiment. Training dataset 124 includes images of flowers. Architecture 300 includes an input layer 302 that provides input to a first convolution layer 304 that provides input to a second convolution layer 306 that provides input to a pooling layer 308 that provides input to a fully connected layer 310 that provides input to an output layer 312 that indicates a type of flower for each image. The flower type prediction may be correct or in error. A measure of the error in terms of an objective function is fed back to drive the adjustment of weights associated with each neuron of architecture 300. Gradients may be computed each iteration through back propagation through the architecture and also used to drive the adjustment of weights associated with each neuron of architecture 300 as described further below.

Referring again to FIG. 2A, in an operation 204, a fifth indicator of an initial weight vector $w_0$ or a methodology by which the initial weight vector $w_0$ is defined may be received. In an alternative embodiment, the fifth indicator may not be received. For example, a default value may be stored, for example, in computer-readable medium 108 and used automatically. In another alternative embodiment, the initial weight vector $w_0$ may not be definable. Instead, a fixed, predefined vector may be used. In an illustrative embodiment, the methodology may be to read values from a weight vector input file indicated by the fifth indicator or by default.

In an operation 205, a sixth indicator of an objective function used to compute a model error may be received. In an alternative embodiment, the sixth indicator may not be received. For example, a default objective function may be stored, for example, in computer-readable medium 108 and used automatically. In another alternative embodiment, the objective function may not be selectable. Instead, a fixed, predefined objective function may be used. For illustration, a default objective function may be $$f(w) = \frac{1}{N}\sum_{i=0}^{N} L(w; x_i, y_i) + \lambda_1 \|w\|_1 + \frac{\lambda_2}{2}\|w\|_2^2$$

where $L(w; x_i, y_i)$, is the loss associated with observation i having observation vector $x_i$ with the target variable value $y_i$, $\lambda_1$ is an L1 regularization parameter, $\|\ \|_1$ indicates an L1 norm, $\lambda_2$ is an L2 regularization parameter, and $\|\ \|_2$ indicates an L2 norm, though other functions may be used. $\lambda_1$ and $\lambda_2$ are greater than or equal to zero. Default values for $\lambda_1$ and $\lambda_2$ may be zero. $L(w; x_i, y_i)$, $\lambda_1$, and $\lambda_2$ may further be defined based on the sixth indicator.

In an operation 206, a seventh indicator of an initial mini-batch size value $n_0$ may be received. In an alternative embodiment, the seventh indicator may not be received. For example, a default value may be stored, for example, in computer-readable medium 108 and used automatically. In another alternative embodiment, the value of the initial mini-batch size value $n_0$ may not be selectable. Instead, a fixed, predefined value may be used. For illustration, a default value for the initial mini-batch size value $n_0$ value may be $n_0=4$ though other values may be used. The initial mini-batch size value $n_0$ indicates an initial number of observation vectors to selected from training dataset 124.

In an operation 207, an eighth indicator of a number of pairs parameter value m may be received. In an alternative embodiment, the eighth indicator may not be received. For example, a default value may be stored, for example, in computer-readable medium 108 and used automatically. In another alternative embodiment, the value of the number of pairs parameter value m may not be selectable. Instead, a fixed, predefined value may be used. For illustration, a default value of the number of pairs parameter value m may be m=4 though other values may be used.

In an operation 208, a ninth indicator of a restart option parameter value $\hat{m}$ may be received where $\hat{m} \leq m$. In an alternative embodiment, the ninth indicator may not be received. For example, a default value may be stored, for example, in computer-readable medium 108 and used automatically. In another alternative embodiment, the value of the restart option parameter value $\hat{m}$ may not be selectable. Instead, a fixed, predefined value may be used. For illustration, a default value of the restart option parameter value $\hat{m}=m$ though other values may be used.

In an operation 209, a tenth indicator of a restart tolerance parameter value $\tau$ may be received. In an alternative embodiment, the tenth indicator may not be received. For example, a default value may be stored, for example, in computer-readable medium 108 and used automatically. In another alternative embodiment, the value of the restart tolerance parameter value $\tau$ may not be selectable. Instead, a fixed, predefined value may be used. For illustration, a default value of the restart tolerance parameter value $\tau$ may be $\tau=0.01$ though other values may be used.

In an operation 210, an eleventh indicator of an initial radius value $\delta_0$ and a progressive radius parameter value $\zeta$ may be received. In an alternative embodiment, the eleventh indicator may not be received. For example, default values may be stored, for example, in computer-readable medium 108 and used automatically. In another alternative embodiment, the values of the initial radius value $\delta_0$ and the progressive radius parameter value $\zeta$ may not be selectable. Instead, fixed, predefined values may be used. The initial radius value $\delta_0$ may have any value between zero and one, inclusive. For illustration, a default value of the initial radius value $\delta_0$ may be $\delta_0=0.0001$ though other values may be used. The initial radius value $\delta_0$ is a control parameter value that is used to define a size of an initial trust-region. The progressive radius parameter value $\zeta$ may have any value between zero and one, inclusive. For illustration, a default value of the progressive radius parameter value $\zeta$ may be $\zeta=1$ though other values may be used. The progressive radius parameter value $\zeta$ is a control parameter value that is used to relax a trust-region ratio progress check by averaging past ratios.

In an operation 211, a twelfth indicator of a progress check frequency value K may be received. In an alternative embodiment, the twelfth indicator may not be received. For example, a default value may be stored, for example, in computer-readable medium 108 and used automatically. In another alternative embodiment, the value of the progress check frequency value K may not be selectable. Instead, a fixed, predefined value may be used. For illustration, a default value of the progress check frequency value K may be K=50 though other values may be used. The progress check frequency value K determines how frequently a progress check is performed.

In an operation 212, a thirteenth indicator of a first threshold parameter value $\gamma_1$ and a second threshold parameter value $\gamma_2$ may be received. In an alternative embodiment, the thirteenth indicator may not be received. For example, default values may be stored, for example, in computer-readable medium 108 and used automatically. In another alternative embodiment, the values of the first threshold parameter value $\gamma_1$ and the second threshold parameter value $\gamma_2$ may not be selectable. Instead, fixed, predefined values may be used. The first threshold parameter value $\gamma_1$ may have any value between zero and one, inclusive. For illustration, a default value of the first threshold parameter value $\gamma_1$ may be $\gamma_1=0$ though other values may be used. The first threshold parameter value $\gamma_1$ is a control parameter value that is used to define a next batch size. The second threshold parameter value $\gamma_2$ may have any value between zero and one, inclusive. For illustration, a default value of the second threshold parameter value $\gamma_2$ may be $\gamma_2=0$ though other values may be used. The second threshold parameter value $\gamma_2$ is a control parameter value that is used to define the next batch size by relaxing a strict-decrease condition.

In an operation 213, a fourteenth indicator of search direction parameter values such as a momentum parameter value $\mu$, an SGD hybrid parameter value $\eta$, a test parameter value $\xi$, a control parameter value $c_1$, a learning rate parameter value $\alpha_0$, and an update parameter value $\tau_s$ may be received. In an alternative embodiment, the fourteenth indicator may not be received. For example, default values may be stored, for example, in computer-readable medium 108 and used automatically. In another alternative embodiment, the values of the momentum parameter value $\mu$, the SGD hybrid parameter value $\eta$, the test parameter value $\xi$, the control parameter value $c_1$, the learning rate parameter value $\alpha_0$, and the update parameter value $\tau_s$ may not be selectable. Instead, fixed, predefined values may be used. The momentum parameter value $\mu$ may have any value between zero and one, inclusive. For illustration, a default value of the momentum parameter value $\mu$ may be $\mu=0.9$ though other values may be used. The SGD hybrid parameter value $\eta$ may have any value between zero and one, inclusive. For illustration, a default value of the SGD hybrid parameter value $\eta$ may be $\eta=0$ though other values may be used. The test parameter value $\xi$ may have any value greater than zero. For illustration, a default value of the test parameter value $\xi$ may be $\xi=0.0001$ though other values may be used. The control parameter value $c_1$ may have any value between zero and one, inclusive. For illustration, a default value of the control parameter value $c_1$ may be $c_1=0.0001$ though other values may be used. The learning rate parameter value $\alpha_0$ may have any value greater than zero. For illustration, a default value of the learning rate parameter value $\alpha_0$ may be $\alpha_0=1$ though other values may be used. The update parameter value $\tau_s$ may have any value between zero and one, inclusive. For illustration, a default value of the update parameter value $\tau_s$ may be $\tau_s=0.5$ though other values may be used.

In an operation 214, a fifteenth indicator of a maximum number of iterations $I_{max}$ and/or a convergence criterion value E may be received. In an alternative embodiment, the fifteenth indicator may not be received. For example, default value(s) may be stored, for example, in computer-readable medium 108 and used automatically. In another alternative embodiment, the value of the maximum number of iterations $I_{max}$ may not be selectable. Instead, a fixed, predefined value may be used. For illustration, a default value of the maximum number of iterations $I_{max}$ may be $I_{max}=250$ though other values may be used. In another alternative embodiment, the value of the convergence criterion value ∈ may not be selectable. Instead, a fixed, predefined value may be used. For illustration, a default value of the convergence criterion value ∈ may be ∈$=1.0e-8$ though other values may be used. The maximum number of iterations $I_{max}$ indicates how many iterations are performed as part of the training of the neural network defined in operation 206 before training is stopped. In addition, or in the alternative, training may be stopped when the convergence criterion value E is satisfied. In alternative embodiments, a maximum computing time may be specified in addition to or instead of the maximum number of iterations $I_{max}$ and used in a similar manner to stop the training process when the maximum computing time is reached.

In an operation 215, parameters are initialized. For example, an iteration index k is initialized, for example, as k=0; T=0; $\alpha_s=\alpha_0$; $\delta=\delta_0$; $\hat{p}=0$; s=y=v=0; S=Y=[]; $B_0$=[]; $n_0=n_0$ where [] indicates an empty set.

Figure 2B:
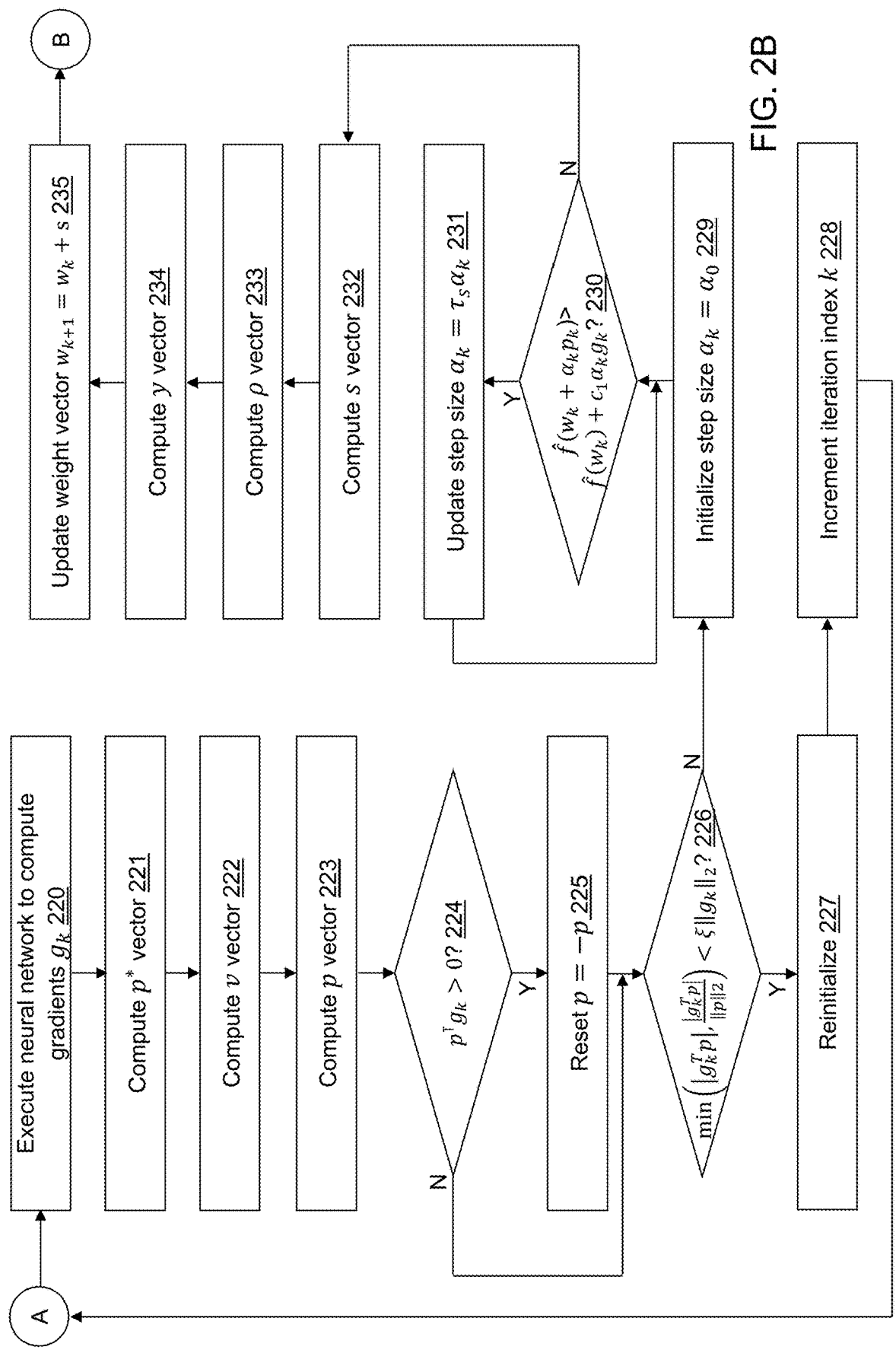

In an operation 216, the initial mini-batch size value $n_0$ number of observation vectors are selected from training dataset 124, and processing continues with an operation 220 show referring to FIG. 2B. The observation vectors may be randomly selected from training dataset 124 with replacement in an illustrative embodiment.

In operation 220, the neural network defined by the architecture specified in operation 203 is executed with the selected observation vectors to compute weight vector $w_k$ and gradient vector $g_k$ that includes values for each neuron of the neural network. $g_k=\nabla f(w_k)$ represents the gradient evaluated at a batch set $\mathcal{J}$ defined by the selected observation vectors, where $\nabla$ indicates a first derivative.

In an operation 221, a first trust region parameter p* is computed by applying algorithm 2 as described in J. Erway, et al., *Trust region algorithms for training responses: machine learning methods using indefinite hessian approximations*, Optimization Methods and Software 1-28 (May 23, 2019) using the current S, Y pairs.

A trust-region approach solves nonconvex optimization problems by iteratively modeling the objective function using quadratic models in a trusted vicinity of a current iterate. This is done by solving a nonconvex quadratic programming (QP) subproblems subject to the trust-region constraint. A trust-region radius is dynamically adjusted based on how accurate the quadratic model is within the trust region. That is, to solve $$\min_{w \in \mathbb{R}^d} \hat{f}(w) = \frac{1}{|\mathcal{J}|} \sum_{i \in \mathcal{J}} f_i(w),$$

at each iteration k, the following QP subproblem is solved:

$$\min_{p \in \mathbb{R}^d} q_k(p) = p^T g_k + \frac{1}{2} p^T H_k p,$$
$$\text{subject to } \|p\| \leq \delta_k$$

where $\tau$ indicates a transpose, $g_k=\nabla \hat{f}(w_k)$ and $H_k=\nabla^2 \hat{f}(w_k)$ form the quadratic model of the loss function at iterate $w_k$ defined with the current mini-batch $\mathcal{J}$, $\|\ \|$ indicates a Euclidean norm. A ratio of an actual reduction and relative to a predicted reduction for objective function $\hat{f}(w)$ is defined as $$\rho_k = \frac{\hat{f}(w_k+p) - \hat{f}(w_k)}{m_k(p) - m_k(0)},$$

which helps measure a quality of the model around radius $\delta_k$. Thus, it makes sense to expand the region by increasing $\delta_k$ when $\rho_k$ is sufficiently large (close to 1) and decrease $\delta_k$ when $\rho_k$ is small. Trust-region approaches have shown favorable convergence properties for nonconvex optimization problem.

Since evaluating $H_k=\nabla^2 \hat{f}(w_k)$ at each iterate $w_k$, where $\nabla^2$ indicates a second derivative, could be expensive in large-scale problems, often quasi-Newton methods are used to exploit the gradient information and gradually build an approximation $B_k$ of the Hessian matrix using secant updates. The SR1 update is an indefinite update of a Broyden class such that the $B_k$ matrix is updated using $$B_{k+1} = B_k + \frac{1}{s_k^T(y_k - B_k s_k)}(y_k - B_k s_k)(y_k - B_k s_k)^T,$$

where $s_k$ and $y_k$ are defined as $y_k = \nabla \hat{f}(w_k) - \nabla \hat{f}(w_{k-1})$ and $s_k = w_k - w_{k-1}$, $s_k$ and $y_k$ are aggregated iteratively in matrices S and Y, respectively.

At each iteration, it is assumed that $s_k^T(y_k - B_k s_k) \neq 0$, i.e., all of the updates are well-defined, otherwise the update is skipped. Unlike BFGS updates, regardless of the sign of $y_k^T s_k$, the SR1 update is always well-defined making it attractive especially in deep learning where the sampled function and its gradient evaluations can involve different batches. For large-scale problems, the limited memory quasi-Newton method, including L-SR1, has been developed.

Previously described limited memory stochastic SR1 with a trust-region (L-SSR1-TR) have been found that sometimes stall because of the poor quality of the search direction due to noise in the stochastic gradients that are prevalent in batch deep learning problems. For instance, the search directions can become parallel to the previously generated directions, especially when false curvature information is captured in matrix $B_k$, leading to inaccurate approximation of the local quadratic model. As a result, the algorithm stalls the optimization progress.

It is computationally expensive to evaluate the loss function value on the entire training dataset 124 every J iterations. Using neural network model training application 122, there is no function evaluation on the entirety of training dataset 124 unless the batch-size reaches N. Batch gradient information and the intrinsic stochastic noise deteriorate the accuracy of the quadratic model around the current iterate. To address this, neural network model training application 122 applies a new restart strategy for the SR1 update is used to remedy cases of small ratio ρ due to the inaccurate model. Progress checks with less strict conditions monitor the reduction in loss function so that processing can move on to the next batch without increasing the batch size. Additionally, neural network model training application 122 uses a new progressive trust-region radius update for defining a next QP trust-region subproblem to account for randomness due to batching.

In an operation 222, a second trust region parameter v is computed using $v = \mu v - \eta \alpha_s g_k + (1-\eta)s$ followed by $v = \min(1, \delta/\|v\|)v$. The hybrid parameter η generalize the algorithm framework and leverages the power of the SGD direction by including a convex combination of the trust-region and SGD directions parameterized by η. The update reflects a pure trust-region solution s and pure SGD direction $-\alpha_k g$ in two extreme cases of η=0 and η=1, respectively.

In an operation 223, a search direction vector p is computed using $p = (1-\eta)p^* + \mu v$ followed by $p = \min(1, \delta/\|p\|)p$.

In an operation 224, a determination is made concerning whether $p^\tau g_k > 0$. When $p^\tau g_k > 0$, processing continues in an operation 225. When $p^\tau g_k \leq 0$, processing continues in an operation 226.

In operation 225, p is reset using $p = -p$ to make sure that the search along with the new direction can improve the loss function.

In operation 226, a determination is made concerning whether $$\min\left(|g_k^T p|, \frac{|g_k^T p|}{\|p\|_2}\right) < \xi \|g\|_2,$$

where $\| \|$ indicates an absolute value. When $$\min\left(|g_k^T p|, \frac{|g_k^T p|}{\|p\|_2}\right) < \xi \|g_k\|_2,$$

processing continues in an operation 227. When $$\min\left(|g_k^T p|, \frac{|g_k^T p|}{\|p\|_2}\right) < \xi \|g_k\|_2,$$

processing continues in an operation 229.

In operation 227, L-SR1 processing is restarted with an initial matrix $H_k$ defined as the identity matrix I using $H_k = I$ because a local model accuracy has diverged from an underlying true function.

In an operation 228, the iteration index k is incremented, for example, using $k = k+1$, and processing continues in operation 220.

In operation 229, a step size $\alpha_k$ is initialized, for example, using $\alpha_k = a_0$.

In an operation 230, a determination is made concerning whether $\hat{f}(w_k + \alpha_k p) > \hat{f}(w_k) + c_1 \alpha_k g_k$, where $\hat{f}(w_k + \alpha_k p)$ is the objective function evaluated at $w_k + \alpha_k p$, and where $\hat{f}(w_k)$ is the objective function evaluated at $w_k$. When $\hat{f}(w_k + \alpha_k p) > \hat{f}(w_k) + c_1 \alpha_k g_k$, processing continues in an operation 232. When $\hat{f}(w_k + \alpha_k p) \leq \hat{f}(w_k) + c_1 \alpha_k g_k$, processing continues in an operation 231.

In operation 231, the step size $\alpha_k$ is updated, for example, using $\alpha_k = \tau_s \alpha_k$, and processing continues in operation 230 to compute another objective function at $w_k + \alpha_k p$ and determine if the step size $\alpha_k$ satisfies the line search criteria.

In operation 232, a step vector s is computed using $s = \alpha_k p$.

In an operation 233, a ratio vector ρ is computed using $\rho = R_k(p^*)/Q_k(p^*)$, where $R_k(p^*) = \hat{f}(w_k + p^*) - \hat{f}(w_k)$ and $Q_k(p^*) = p^* - q(0)$, where $\hat{f}(w_k + p^*)$ is the objective function evaluated at $w_k + p^*$, q(p) is defined by a quadratic model at p using $$q(p) = p^T g_k + \frac{1}{2} p^T B_k p$$

q(0)=0 is defined by the quadratic model at 0, where $$B_{k+1} = B_k + \frac{1}{s_k^T(y_k - B_k s_k)}(y_k - B_k s_k)(y_k - B_k s_k)^T.$$

In an operation 234, an objective difference vector y is computed using $y = g_{k+1} - g_k$, where $g_{k+1} = \nabla \hat{f}(w_k + s)$ is computed by computing the gradient vector using the weight vector defined as $w_k + s$.

Figure 2C:
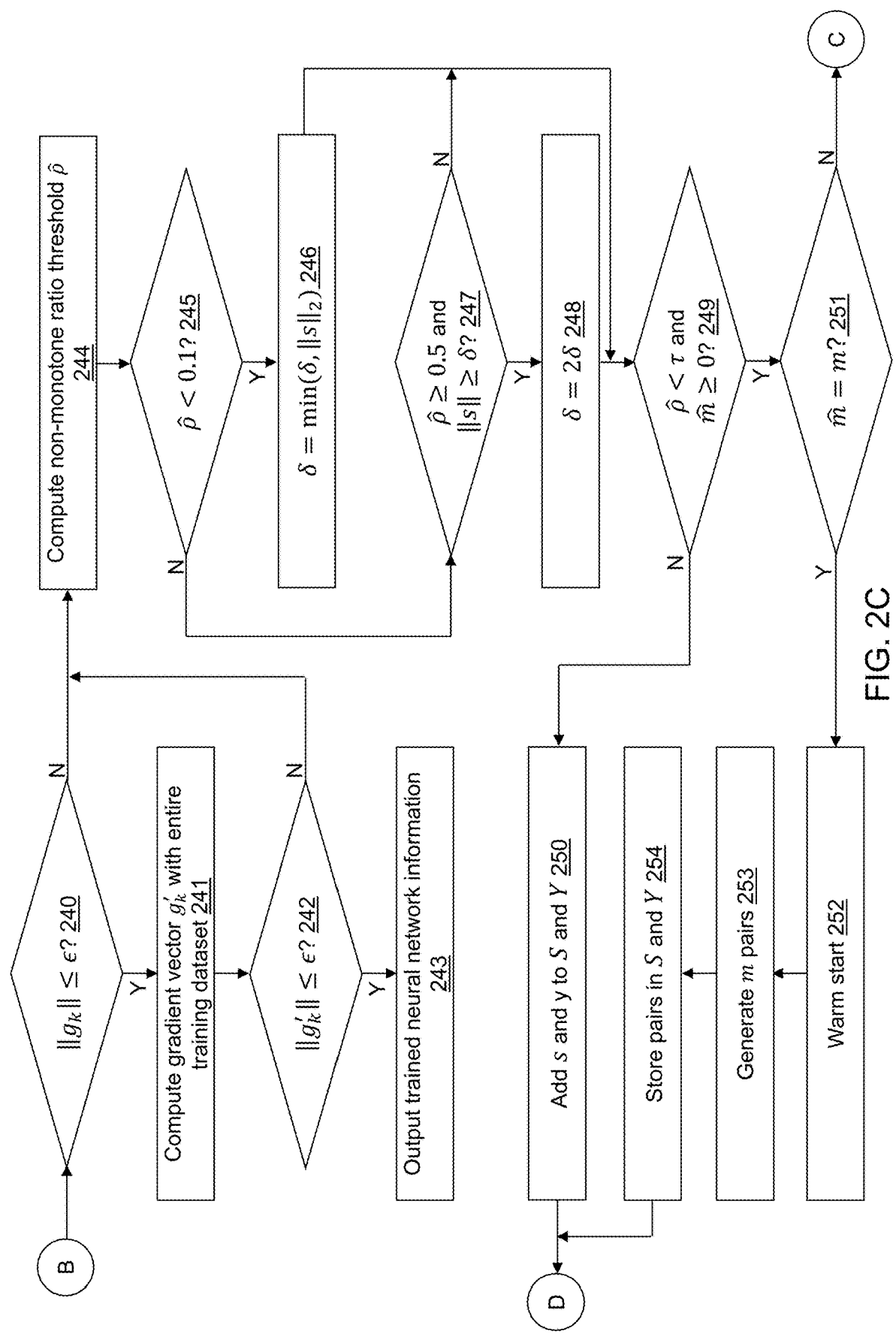

In an operation 235, the weight vector $w_k$ is updated using $w_{k+1}=w_k+s$, and processing continues in operation 240 shown referring to FIG. 2C.

In an operation 240, a determination is made concerning whether $\|g_k\|\le\epsilon$. When $\|g_k\|\le\epsilon$, processing continues in an operation 241. When $\|g_k\|>\epsilon$, processing continues in an operation 244.

In operation 241, the neural network defined by the architecture specified in operation 203 is executed with the observation vectors included in training dataset 124 to compute gradient vector $g_k'$.

In an operation 242, a determination is made concerning whether $\|g_k'\|\le\epsilon$. When $\|g_k'\|\le\epsilon$, processing continues in an operation 243. When $\|g_k'\|>\epsilon$, processing continues in an operation 244.

In operation 243, the neural network model description including $w_k$ is output. For example, the neural network model description may be output to neural network model description 126. The neural network model description may include the neural network architecture. For illustration, the trained neural network model may be stored using the ASTORE procedure provided by SAS® Visual Data Mining and Machine Learning software.

In operation 244, a non-monotone ratio threshold value $\hat{\rho}$ is updated using $\hat{\rho}=\zeta T\hat{\rho}+\hat{\rho}$ followed by $T=\zeta T+1$, further followed by $\hat{\rho}=\hat{\rho}/T$.

In an operation 245, a determination is made concerning whether $\hat{\rho}<0.1$. When $\hat{\rho}<0.1$, processing continues in an operation 246. When $\hat{\rho}\ge 0.1$, processing continues in an operation 247.

In operation 246, a trust-region radius value $\delta$ is updated using $\delta=\min(\delta, \|s\|_2)$, and processing continues in an operation 249.

In operation 247, a determination is made concerning whether $\hat{\rho}\ge 0.5$ and $\|s\|\ge\delta$. When $\hat{\rho}\ge 0.5$ and $\|s\|\ge\delta$, processing continues in an operation 248. When $\hat{\rho}<0.5$ or $\|s\|<\delta$, processing continues in operation 249.

In operation 248, $\delta$ is updated using $\delta=2\delta$.

In operation 249, a determination is made concerning whether $\rho<\tau$ and $\hat{m}\ge 0$. When $\rho<\tau$ and $\hat{m}\ge 0$, processing continues in an operation 251. When $\rho\ge\tau$ or $\hat{m}<0$, processing continues in an operation 250.

Figure 2D:
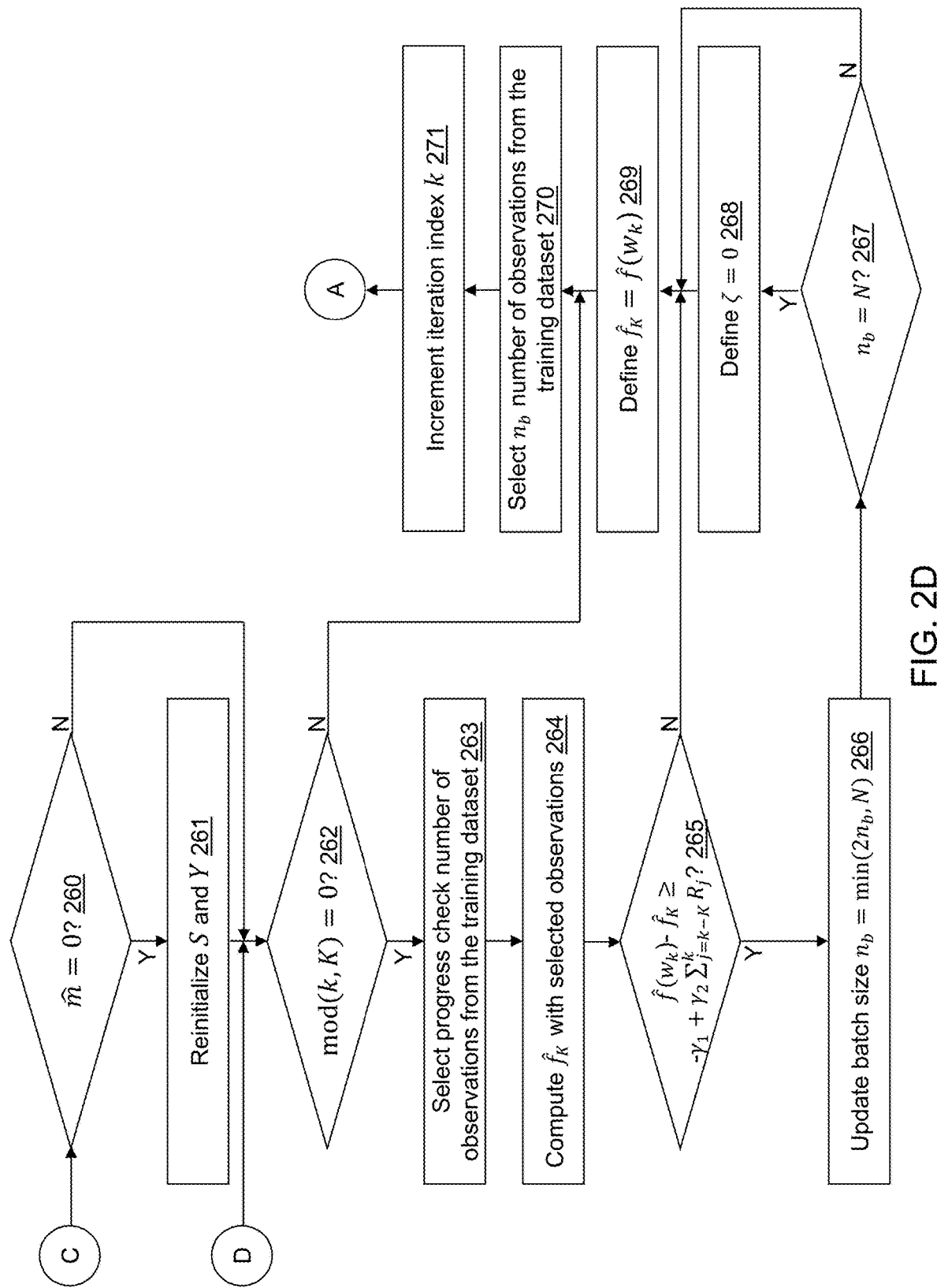

In operation 250, s is added as a new column in S, y is added as a new column in Y, and processing continues in an operation 262 shown referring to FIG. 2D. A first column is removed from matrices S and Y when a number of columns exceeds m before adding the new column.

In operation 251, a determination is made concerning whether $\hat{m}=m$. When $\hat{m}=m$, processing continues in an operation 252. When $\hat{m}\ne m$, processing continues in an operation 260 shown referring to FIG. 2D.

In operation 252, a warm start is performed as described in A. Berahas, et al., *Quasi-newton methods for deep learning: Forget the past, just sample*, arXiv:1901.09997 (Jan. 28, 2019) by random sampling around the current iteration of the weights $w_k$. Matrices S and Y are reinitialized to empty matrices.

In an operation 253, m number of pairs of (s, y) are generated, where $s_i=w_k+r_i$, where $r_i$ is a randomly generated vector, and $y_i=\nabla\hat{f}(s_i)-\nabla\hat{f}(w_k)$.

In an operation 254, the generated m number of pairs of (s, y) are stored in respective columns of matrices S and Y, and processing continues in operation 260 shown referring to FIG. 2D.

In operation 260, a determination is made concerning whether $\hat{m}=0$. When $\hat{m}=0$, processing continues in an operation 261. When $\hat{m}\ne 0$, processing continues in operation 262.

In operation 261, S and Y are reinitialized using S=Y=[ ] to perform a vanilla restart of the current stored quasi-Newton pairs.

In operation 262, a determination is made concerning whether mod(k, K)=0. When mod(k, K)=0, processing continues in an operation 263. When mod(k, K)=0, processing continues in an operation 270.

In operation 263, a progress check number of observation vectors $\hat{n}=\min(1.1n_b, 5000)$ are selected from training dataset 124.

In an operation 264, the objective function $\hat{f}_K$ is evaluated using the selected progress check number of observation vectors $\hat{n}$.

In operation 265, a determination is made concerning whether $$\hat{f}(w_k)-\hat{f}_K \ge -\gamma_1+\gamma_2\sum_{j=k-K}^{k} R_j,$$

where $R_j=\hat{f}(w_j+p^*)-\hat{f}(w_j)$. When $$\hat{f}(w_k)-\hat{f}_K \ge -\gamma_1+\gamma_2\sum_{j=k-K}^{k} R_j,$$

processing continues in an operation 266. When $$f\hat{f}(w_k)-\hat{f}_K < -\gamma_1+\gamma_2\sum_{j=k-K}^{k} R_j,$$

processing continues in an operation 269. The second progress threshold parameter $\gamma_2$ relaxes the strict-decrease condition to prevent the batch size $n_k$ from quickly reaching N and including all of the observation vectors included in training dataset 124 if a sufficient decrease in the objective is obtained.

In operation 266, $n_k$ is updated using $n_b=\min(2n_b, N)$, because the progress is worse than if a simple line-search was used.

In operation 267, a determination is made concerning whether $n_b=N$. When $n_b=N$, processing continues in an operation 268. When $n_b\ne N$, processing continues in operation 269.

In operation 268, is $\zeta$ updated using $\zeta=0$. $\zeta$ can be used to relax the trust-region ratio progress check by averaging past ratios to soften an effect of the ratio $\rho_k$ as a stochastic term. Ideally, it is preferred that $\lim_{k\to\infty}\rho_k=1$; however, fluctuations in $\rho_k$ are expected.

In operation 269, $\hat{f}_K$ is updated using $\hat{f}_K=\hat{f}(w_k)$.

In operation 270, an $n_b$ number of observation vectors are selected from training dataset 124.

In an operation 271, the iteration index k is incremented, for example, using k=k+1, and processing continues in operation 220.

Referring to FIG. 4, a block diagram of a prediction device 400 is shown in accordance with an illustrative embodiment. Prediction device 400 may include a second input interface 402, a second output interface 404, a second communication interface 406, a second non-transitory computer-readable medium 408, a second processor 410, a prediction application 422, neural network model description 126, second dataset 424, and predicted dataset 426. Fewer, different, and/or additional components may be incorporated into prediction device 400. Prediction device 400 and neural network model training device 100 may be the same or different devices.

Second input interface 402 provides the same or similar functionality as that described with reference to input interface 102 of neural network model training device 100 though referring to prediction device 400. Second output interface 404 provides the same or similar functionality as that described with reference to output interface 104 of neural network model training device 100 though referring to prediction device 400. Second communication interface 406 provides the same or similar functionality as that described with reference to communication interface 106 of neural network model training device 100 though referring to prediction device 400. Data and messages may be transferred between prediction device 400 and a distributed computing system 428 using second communication interface 406. Distributed computing system 130 and distributed computing system 428 may be the same or different computing systems. Second computer-readable medium 408 provides the same or similar functionality as that described with reference to computer-readable medium 108 of neural network model training device 100 though referring to a prediction device 400. Second processor 410 provides the same or similar functionality as that described with reference to processor 110 of neural network model training device 100 though referring to prediction device 400.

Prediction application 422 performs operations associated with classifying or predicting a characteristic value related to each observation vector included in second dataset 424. The predicted characteristic value may be stored in predicted dataset 426 to support various data analysis functions as well as provide alert/messaging related to each prediction that may be a classification. Dependent on the type of data stored in training dataset 124 and second dataset 424, prediction application 422 may identify anomalies as part of process control, for example, of a manufacturing process, for machine condition monitoring, for image classification, for intrusion detection, for fraud detection, for text recognition, for voice recognition, for language translation, etc. Some or all of the operations described herein may be embodied in prediction application 422. The operations may be implemented using hardware, firmware, software, or any combination of these methods.

Referring to the example embodiment of FIG. 4, prediction application 422 is implemented in software (comprised of computer-readable and/or computer-executable instructions) stored in second computer-readable medium 408 and accessible by second processor 410 for execution of the instructions that embody the operations of prediction application 422. Prediction application 422 may be written using one or more programming languages, assembly languages, scripting languages, etc. Prediction application 422 may be integrated with other analytic tools. As an example, prediction application 422 may be part of an integrated data analytics software application and/or software architecture such as that offered by SAS Institute Inc. of Cary, N.C., USA. For example, prediction application 422 may be part of SAS® Enterprise Miner™ developed and provided by SAS Institute Inc. of Cary, N.C., USA. Merely for further illustration, prediction application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA.

One or more operations of prediction application 422 further may be performed by an ESPE on an event stream instead of reading observation vectors from second dataset 424. Prediction application 422 and neural network model training application 122 may be the same or different applications that are integrated in various manners to train a neural network model using training dataset 124 that may be distributed on distributed computing system 130 and to execute the trained neural network model to predict the characteristic of each observation vector included in second dataset 424 that may be distributed on distributed computing system 428.

Prediction application 422 may be implemented as a Web application. Prediction application 422 may be integrated with other system processing tools to automatically process data generated as part of operation of an enterprise, to classify data in the processed data, and/or to provide a warning or alert associated with the prediction using second input interface 402, second output interface 404, and/or second communication interface 406 so that appropriate action can be initiated in response. For example, a warning or an alert may be presented using a second display 416, a second speaker 418, a second printer 420, etc. or sent to one or more computer-readable media, display, speaker, printer, etc. of distributed computing system 428.

Training dataset 124 and second dataset 424 may be generated, stored, and accessed using the same or different mechanisms. The target variable is not defined in second dataset 424. Similar to training dataset 124, second dataset 424 may include a plurality of rows and a plurality of columns with the plurality of rows referred to as observations or records, and the columns referred to as variables that are associated with an observation. Second dataset 424 may be transposed.

Similar to training dataset 124, second dataset 424 may be stored on second computer-readable medium 408 or on one or more computer-readable media of distributed computing system 428 and accessed by prediction device 400 using second communication interface 406. Data stored in second dataset 424 may be a sensor measurement or a data communication value, for example, from a sensor 513, may be generated or captured in response to occurrence of an event or a transaction, generated by a device such as in response to an interaction by a user with the device, for example, from a second keyboard 412 or a second mouse 414, etc. The data stored in second dataset 424 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 424 may be captured at different time points periodically, intermittently, when an event occurs, etc. One or more columns may include a time value. Similar to training dataset 124, data stored in second dataset 424 may be generated as part of the IoT, and some or all data may be pre- or post-processed by an ESPE.

Similar to training dataset 124, second dataset 424 may be stored in various compressed formats such as a coordinate format, a compressed sparse column format, a compressed sparse row format, etc. Second dataset 424 further may be stored using various structures as known to those skilled in the art including a file system, a relational database, a system of tables, a structured query language database, etc. on prediction device 400 and/or on distributed computing system 428. Prediction device 400 may coordinate access to second dataset 424 that is distributed across a plurality of computing devices that make up distributed computing system 428. For example, second dataset 424 may be stored in a cube distributed across a grid of computers as understood by a person of skill in the art. As another example, second dataset 424 may be stored in a multi-node Hadoop® cluster. As another example, second dataset 424 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 424.

Figure 5:
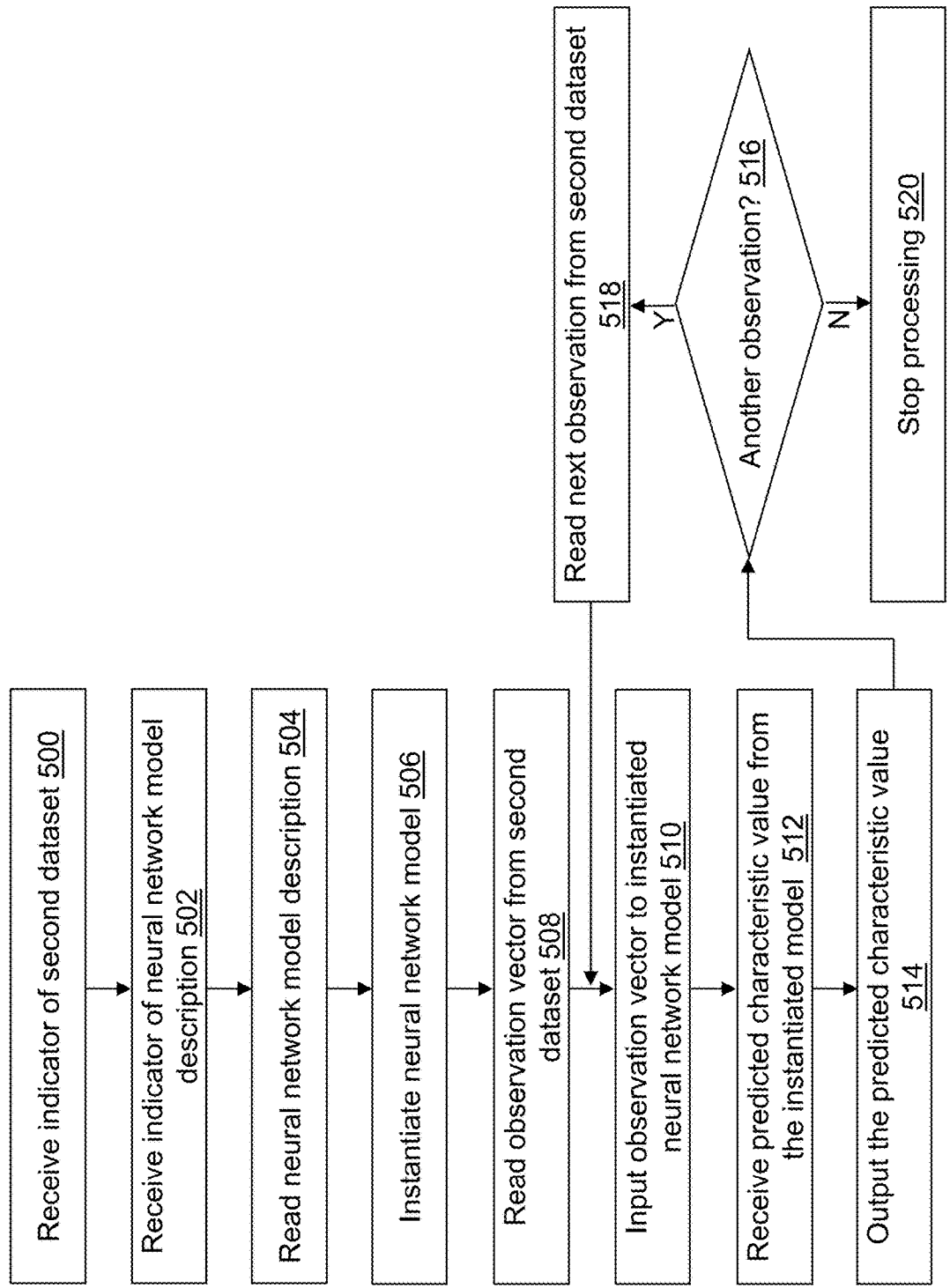
FIG. 5 depicts a flow diagram illustrating examples of operations performed by the prediction device of FIG. 4 in accordance with an illustrative embodiment.

Referring to FIG. 5, example operations of prediction application 422 are described. Additional, fewer, or different operations may be performed depending on the embodiment of prediction application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 428), and/or in other orders than those that are illustrated.

In an operation 500, a fourteenth indicator may be received that indicates second dataset 424. For example, the fourteenth indicator indicates a location and a name of second dataset 424. As an example, the fourteenth indicator may be received by prediction application 422 after selection from a user interface window or after entry by a user into a user interface window. In an alternative embodiment, second dataset 424 may not be selectable. For example, a most recently created dataset may be used automatically.

In an operation 502, a fifteenth indicator may be received that indicates neural network model description 126. For example, the fifteenth indicator indicates a location and a name of neural network model description 126. As an example, the fifteenth indicator may be received by prediction application 422 after selection from a user interface window or after entry by a user into a user interface window. In an alternative embodiment, neural network model description 126 may not be selectable. For example, a most recently created model configuration data may be used automatically. As another example, neural network model description 126 may be provided automatically as part of integration with neural network model training application 122.

In an operation 504, a neural network model description is read from neural network model description 126.

In an operation 506, a neural network model is instantiated with the neural network model description. For example, the architecture of the neural network model, its hyperparameters, its weight vector, and other characterizing elements are read and used to instantiate a neural network model based on the information output from the training process in operation 243.

In an operation 508, an observation vector is read from second dataset 424.

In an operation 510, the observation vector is input to the instantiated model.

In an operation 512, a predicted characteristic value for the read observation vector is received as an output of the instantiated model. The output may include a probability that the observation vector has one or more different possible characteristic values.

In an operation 514, the predicted characteristic value may be output, for example, by storing the predicted characteristic value with the observation vector to predicted dataset 426. In addition, or in the alternative, the predicted characteristic value may be presented on second display 416, printed on second printer 420, sent to another computing device using second communication interface 406, an alarm or other alert signal may be sounded through second speaker 418, etc.

In an operation 516, a determination is made concerning whether or not second dataset 424 includes another observation vector. When second dataset 424 includes another observation vector, processing continues in an operation 518. When second dataset 424 does not include another observation vector, processing continues in an operation 520.

In operation 518, a next observation vector is read from second dataset 424, and processing continues in operation 510.

In operation 520, processing stops and cleanup is performed as needed.

The operations of neural network model training application 122 can be executed in parallel to speed up the training process. Neural network model training application 122 may be executed in a synchronous mode that distributes the gradient computations across a plurality of worker computing devices. Each worker computing device computes the gradient for a portion of training dataset 124 that resides on that worker computing device, and the computed gradients are aggregated on a controller computing device. The weights are updated with the computed gradients and are sent to each worker computing device so that the processing for the next iteration can proceed with the updated weights.

A performance of neural network model training application 122 on standard neural network benchmarks and imbalanced datasets was evaluated. One of the benefits of neural network model training application 122 is that in scenarios where a large batch-size is required (e.g. distributed computing and imbalanced datasets), neural network model training application 122 shows significantly better results compared to the best-tuned SGD as described below.

The empirical performance of neural network model training application 122 was compared to the L-SSR1-TR method and to the SGD method on an image classification task using a first dataset known as the MNIST dataset described in Y. LeCun et al., *Gradient based learning applied to document recognition*, Proceedings of the IEEE 86(11):2278-2324 (1998). The details regarding the neural network structure are summarized in Table 1 below.

TABLE 1

| Network | d | Type | # of layers |
|---|---|---|---|
| Net DNN | 59.9 k | convolutional and fully connected layers | 4 |

Figure 6A:
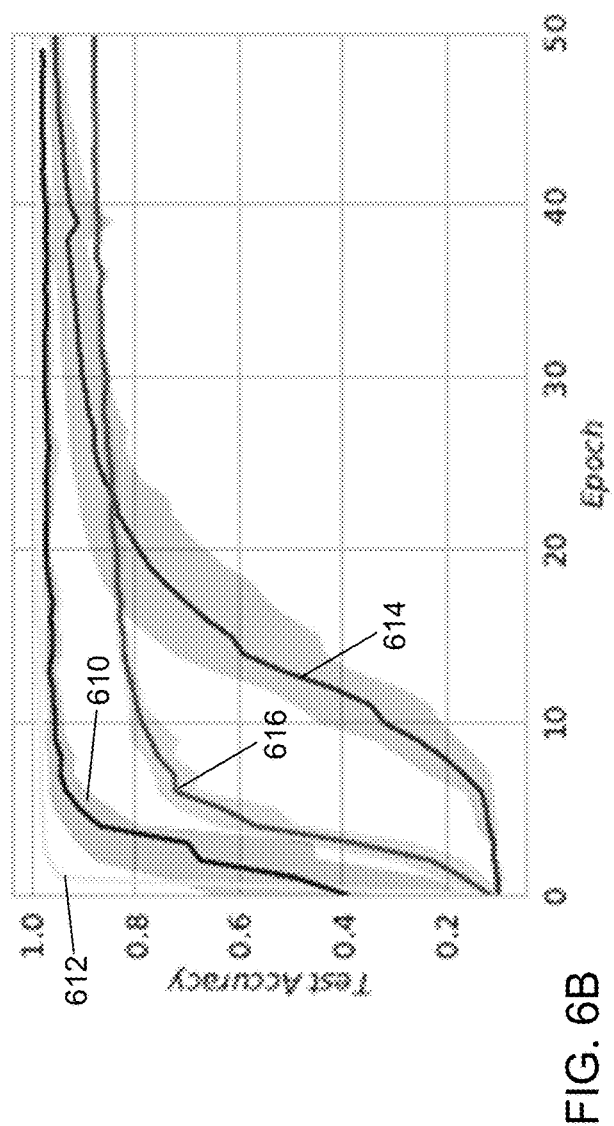
FIGS. 6A, 6B, 6C, 6D, 6G, and 6H provide comparative training and test accuracy results for two different datasets and three different neural network architectures in accordance with an illustrative embodiment.

For a fair comparison, each method was tuned separately. After capturing the best hyperparameter setting for each method, each algorithm was executed 10 times with 10 different random seeds. Referring to FIG. 6A, a first train accuracy curve 600 shows an average accuracy computed across the 10 executions using neural network model training application 122 with the best hyperparameter setting on training dataset 124 extracted from the first dataset, where shading shows a trajectory variation across the 10 executions with different set of hyperparameters. A second train accuracy curve 602 shows an average accuracy computed across the 10 executions using SGD with a batch size of 4048 and the best hyperparameter setting on training dataset 124 extracted from the first dataset. A third train accuracy curve 604 shows an average accuracy computed across the 10 executions using SGD with a batch size of 8192 and the best hyperparameter setting on training dataset 124 extracted from the first dataset. A fourth train accuracy curve 606 shows an average accuracy computed across the 10 executions using L-SSR1-TR and the best hyperparameter setting on training dataset 124 extracted from the first dataset.

Figure 6B:
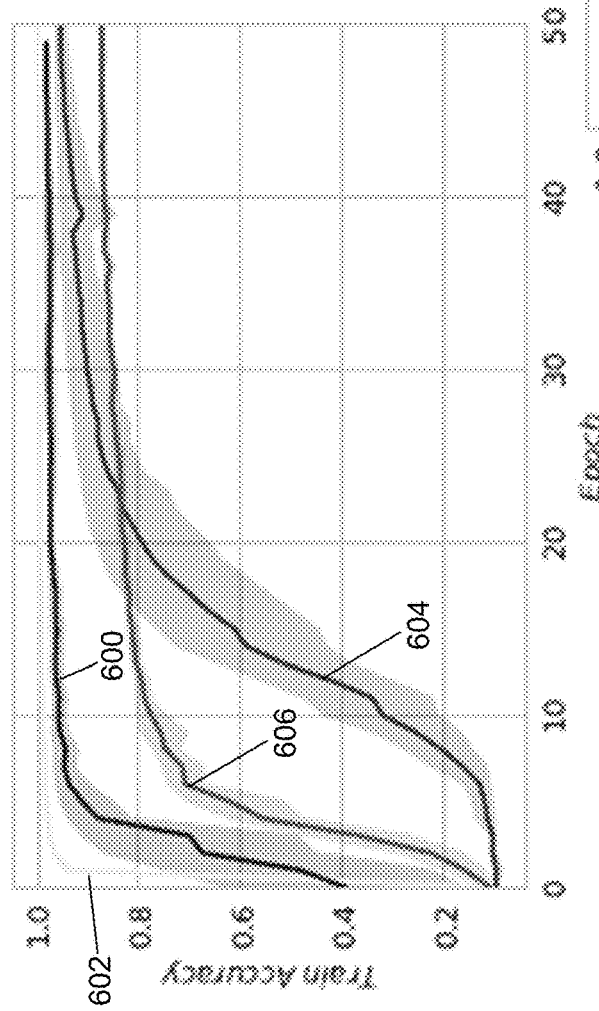

Referring to FIG. 6B, a first test accuracy curve 610 shows an average accuracy computed across the 10 executions using neural network model training application 122 with the respective trained model represented in FIG. 6A on second dataset 424 extracted from the first dataset and excluding training dataset 124. A second test accuracy curve 612 shows an average accuracy computed across the 10 executions using SGD with a batch size of 4048 with the respective trained model represented in FIG. 6A on second dataset 424 extracted from the first dataset and excluding training dataset 124. A third test accuracy curve 614 shows an average accuracy computed across the 10 executions using SGD with a batch size of 8192 with the respective trained model represented in FIG. 6A on second dataset 424 extracted from the first dataset and excluding training dataset 124. A fourth test accuracy curve 616 shows an average accuracy computed across the 10 executions using L-SSR1-TR with the respective trained model represented in FIG. 6A on second dataset 424 extracted from the first dataset and excluding training dataset 124.

The empirical performance of neural network model training application 122 was similarly compared to the L-SSR1-TR method and to the SGD method on an image classification task using a second dataset known as the CIFAR10 dataset described in A. Krizhevsky, et al., *Learning multiple layers of features from tiny images*, TR-2009 University of Toronto (2009). The details regarding the neural network structure are summarized in Table 2 below.

TABLE 2

| Network | d | Type | # of layers |
|---|---|---|---|
| ResNet20 | 272 k | Convolutional layers, batch normalization, and fully connected layers | 9 |

Figure 6C:
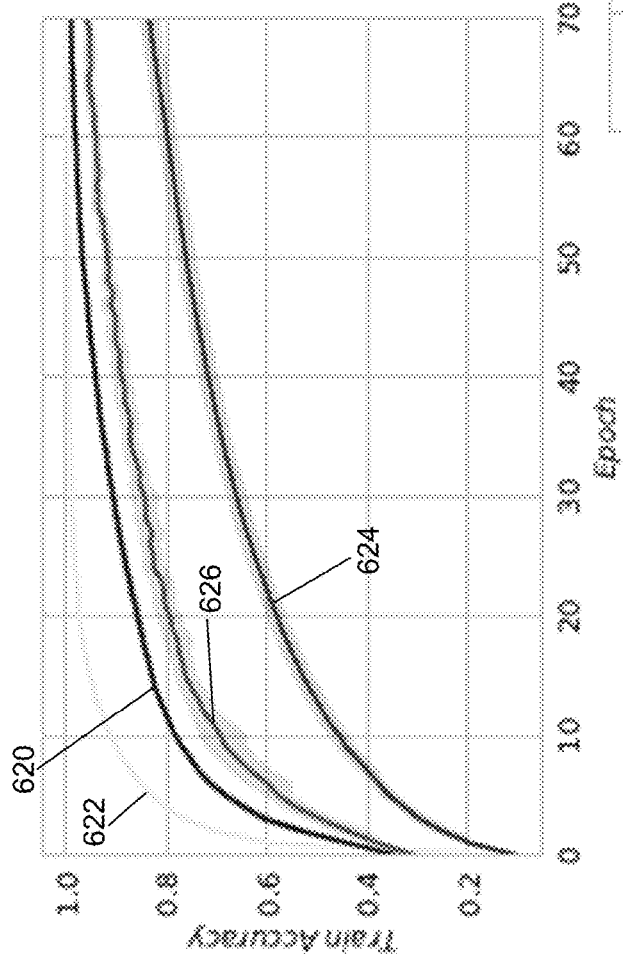

Referring to FIG. 6C, a fifth train accuracy curve 620 shows an average accuracy computed across the 10 executions using neural network model training application 122 with the best hyperparameter setting on training dataset 124 extracted from the second dataset. A sixth train accuracy curve 622 shows an average accuracy computed across the 10 executions using SGD with a batch size of 4048 and the best hyperparameter setting on training dataset 124 extracted from the second dataset. A seventh train accuracy curve 624 shows an average accuracy computed across the 10 executions using SGD with a batch size of 8192 and the best hyperparameter setting on training dataset 124 extracted from the second dataset. An eighth train accuracy curve 626 shows an average accuracy computed across the 10 executions using L-SSR1-TR and the best hyperparameter setting on training dataset 124 extracted from the second dataset.

Figure 6D:
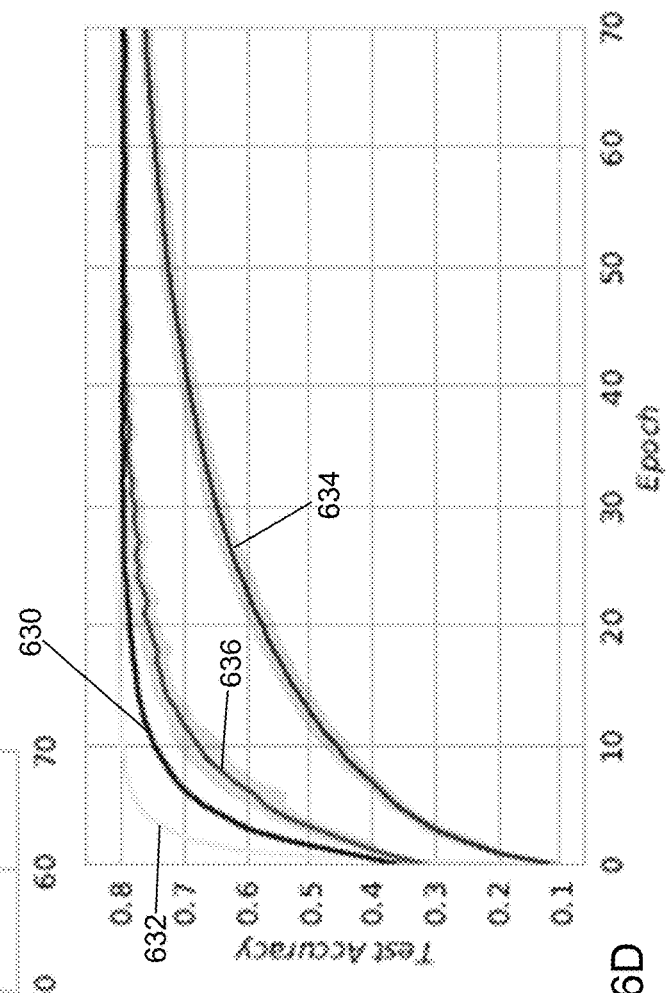

Referring to FIG. 6D, a fifth test accuracy curve 630 shows an average accuracy computed across the 10 executions using neural network model training application 122 with the respective trained model represented in FIG. 6C on second dataset 424 extracted from the second dataset and excluding training dataset 124. A sixth test accuracy curve 632 shows an average accuracy computed across the 10 executions using SGD with a batch size of 4048 with the respective trained model represented in FIG. 6C on second dataset 424 extracted from the second dataset and excluding training dataset 124. A seventh test accuracy curve 634 shows an average accuracy computed across the 10 executions using SGD with a batch size of 8192 with the respective trained model represented in FIG. 6C on second dataset 424 extracted from the second dataset and excluding training dataset 124. An eighth test accuracy curve 636 shows an average accuracy computed across the 10 executions using L-SSR1-TR with the respective trained model represented in FIG. 6C on second dataset 424 extracted from the second dataset and excluding training dataset 124.

Overall, neural network model training application 122 outperformed SGD with the larger batch size of 8192 and is comparable to the best tuned SGD with a smaller batch size of 4048. Neural network model training application 122 generalizes very well for unseen datasets, which is the main goal of learning. The final accuracy of the model trained using neural network model training application 122 matches with SGD.

Figure 6E:
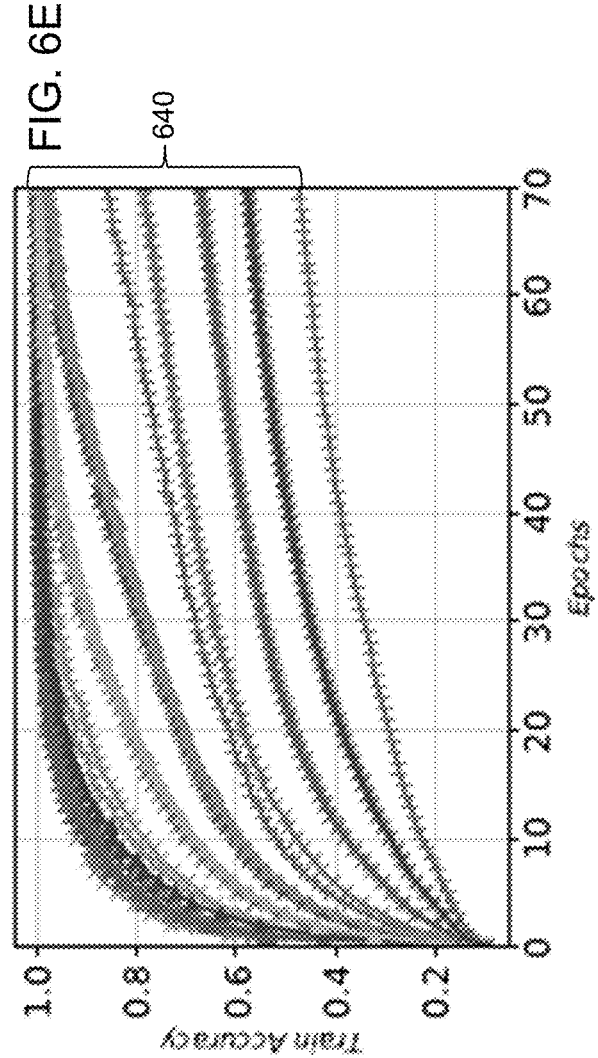
FIGS. 6E and 6F provide comparative training accuracy results as a function of different hyperparameter set evaluations in accordance with an illustrative embodiment.
Figure 6F:
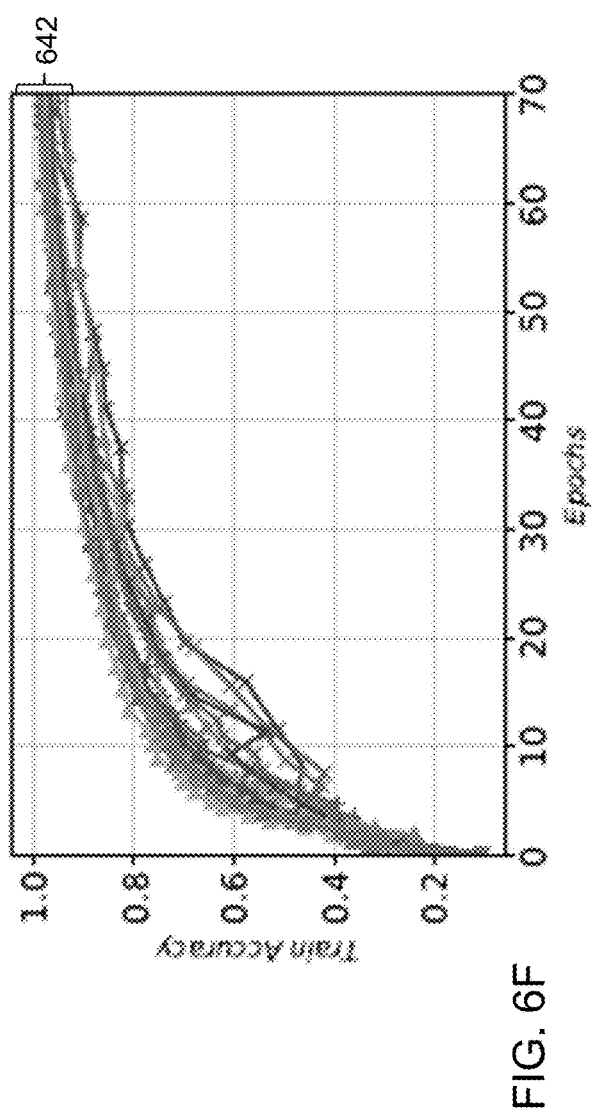

Again, SGD requires meticulous hyperparameter tuning. Referring to FIG. 6E, a first plurality of curves 640 show a wide variation in training accuracy as a result of the different sets of hyperparameters used to generate each respective curve using SGD with the batch size of 4048 meaning that SGD is extremely sensitive to values of the selected hyperparameters. Referring to FIG. 6F, a second plurality of curves 642 show a relatively narrow variation in training accuracy as a result of the different sets of hyperparameters used to generate each curve using neural network model training application 122.

The empirical performance of neural network model training application 122 was similarly compared to the L-SSR1-TR method and to the SGD method on the second dataset using the neural network structure summarized in Table 3 below.

TABLE 3

| Network | d | Type | # of layers |
|---|---|---|---|
| LeNet | 62.2 k | Convolutional layers and fully connected layers | 6 |

Figure 6H:
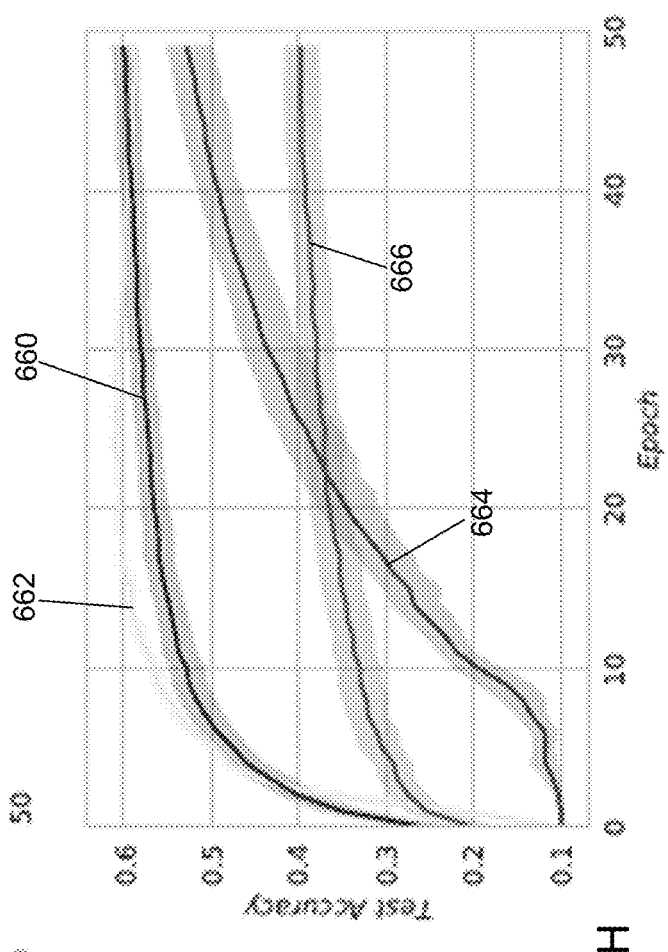
Figure 6G:

Referring to FIG. 6G, a ninth train accuracy curve 650 shows an average accuracy computed across the 10 executions using neural network model training application 122 with the best hyperparameter setting on training dataset 124 extracted from the second dataset. A tenth train accuracy curve 652 shows an average accuracy computed across the 10 executions using SGD with a batch size of 4048 and the best hyperparameter setting on training dataset 124 extracted from the second dataset. An eleventh train accuracy curve 654 shows an average accuracy computed across the 10 executions using SGD with a batch size of 8192 and the best hyperparameter setting on training dataset 124 extracted from the second dataset. A twelfth train accuracy curve 656 shows an average accuracy computed across the 10 executions using L-SSR1-TR and the best hyperparameter setting on training dataset 124 extracted from the second dataset.

Referring to FIG. 6H, a ninth test accuracy curve 660 shows an average accuracy computed across the 10 executions using neural network model training application 122 with the respective trained model represented in FIG. 6C on second dataset 424 extracted from the second dataset and excluding training dataset 124. A tenth test accuracy curve 662 shows an average accuracy computed across the 10 executions using SGD with a batch size of 4048 with the respective trained model represented in FIG. 6C on second dataset 424 extracted from the second dataset and excluding training dataset 124. An eleventh test accuracy curve 664 shows an average accuracy computed across the 10 executions using SGD with a batch size of 8192 with the respective trained model represented in FIG. 6C on second dataset 424 extracted from the second dataset and excluding training dataset 124. A twelfth test accuracy curve 666 shows an average accuracy computed across the 10 executions using L-SSR1-TR with the respective trained model represented in FIG. 6C on second dataset 424 extracted from the second dataset and excluding training dataset 124.

Again, neural network model training application 122 outperformed L-SSR1-TR and SGD with the larger batch size of 8192 and is comparable to the best tuned SGD with the smaller batch size of 4048.

For classification problems, ideally, the dataset has a balanced number of observations for each class though this may not be the case. To evaluate the performance with imbalanced datasets, a set of 27 different problems typically used in benchmarking were selected. These problems that arise from different fields and applications, each demonstrate a different case with different imbalanced ratio of classes. A description of each problem is provided in Table 4 below that includes a problem number, a problem name, a ratio of classes, a number of observation vectors N as well as a number of variables d for each problem.

TABLE 4

| No. | Name | Repository & Target | Ratio | N | d |
|---|---|---|---|---|---|
| 1 | Ecoli | UCI, target: imU | 8:6:1 | 336 | 7 |
| 2 | Optical Digits | UCI, target: 8 | 9.1:1 | 5,620 | 64 |
| 3 | SatImage | UCI, target: 4 | 9.3:1 | 6,435 | 36 |
| 4 | Pen Digits | UCI, target: 5 | 9.4:1 | 10,992 | 16 |
| 5 | Abalone | UCI, target: 7 | 9.7:1 | 4,177 | 8 |
| 6 | Sick Euthyroid | UCI, target: sick euthyroid | 9.8:1 | 3,163 | 25 |
| 7 | Spectrometer | UCI, target: >=44 | 11:01 | 531 | 93 |
| 8 | Car_Eval_34 | UCI, target: good, v good | 12:01 | 1,728 | 6 |
| 9 | ISOLET | UCI, target: A, B | 12:01 | 7,797 | 617 |
| 10 | US Crime | UCI, target: >0.65 | 12:01 | 1,994 | 122 |
| 11 | Yeast_ML8 | LIBSVM, target: 8 | 13:01 | 2,417 | 103 |
| 12 | Scene | LIBSVM, target: >one label | 13:01 | 2,407 | 294 |
| 13 | Libras Move | UCI, target: 1 | 14:01 | 360 | 90 |
| 14 | Thyroid Sick | UCI, target: sick | 15:01 | 3,772 | 28 |
| 15 | Coil_2000 | KDD, CoIL, target: minority | 16:01 | 9,822 | 85 |
| 16 | Arrhythmia | UCI, target: 06 | 17:01 | 452 | 279 |
| 17 | Solar Flare M0 | UCI, target: M->0 | 19:01 | 1,389 | 10 |
| 18 | OIL | UCI, target: minority | 22:01 | 937 | 49 |
| 19 | Car_Eval_4 | UCI, target: vgood | 26:01 | 1,728 | 6 |
| 20 | Wine Quality | UCI, wine, target: <=4 | 26:01 | 4,898 | 11 |
| 21 | Letter Img | UCI, target: Z | 26:01 | 20,000 | 16 |
| 22 | Yeast_ME2 | UCI, target: ME2 | 28:01 | 1,484 | 8 |
| 23 | Webpage | LIBSVM, w7a, target: minority | 33:01 | 49,749 | 300 |
| 24 | Ozone Level | UCI, ozone, data | 34:01 | 2,536 | 72 |
| 25 | Mammography | UCI, target: minority | 42:01 | 11,183 | 6 |
| 26 | Protein homo. | KDD CUP 2004, minority | 111:01 | 145,751 | 74 |
| 27 | Abalone_19 | UCI, target: 19 | 130:01 | 4,177 | 8 |

Figure 7A:
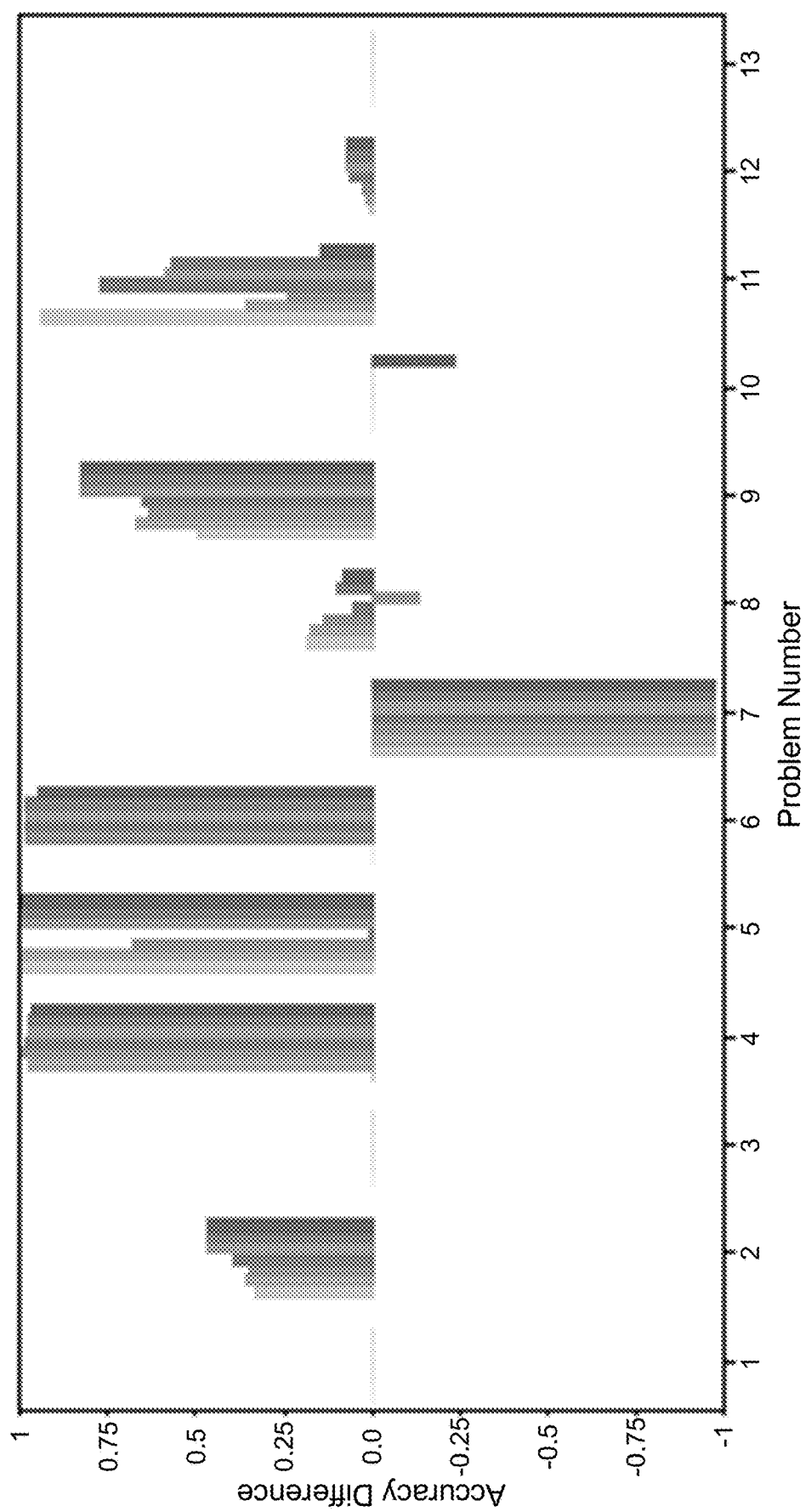
FIGS. 7A and 7B provide a difference between training accuracy results computed using the neural network model training application and SGD for 27 different imbalanced dataset problems in accordance with an illustrative embodiment.
Figure 7B:
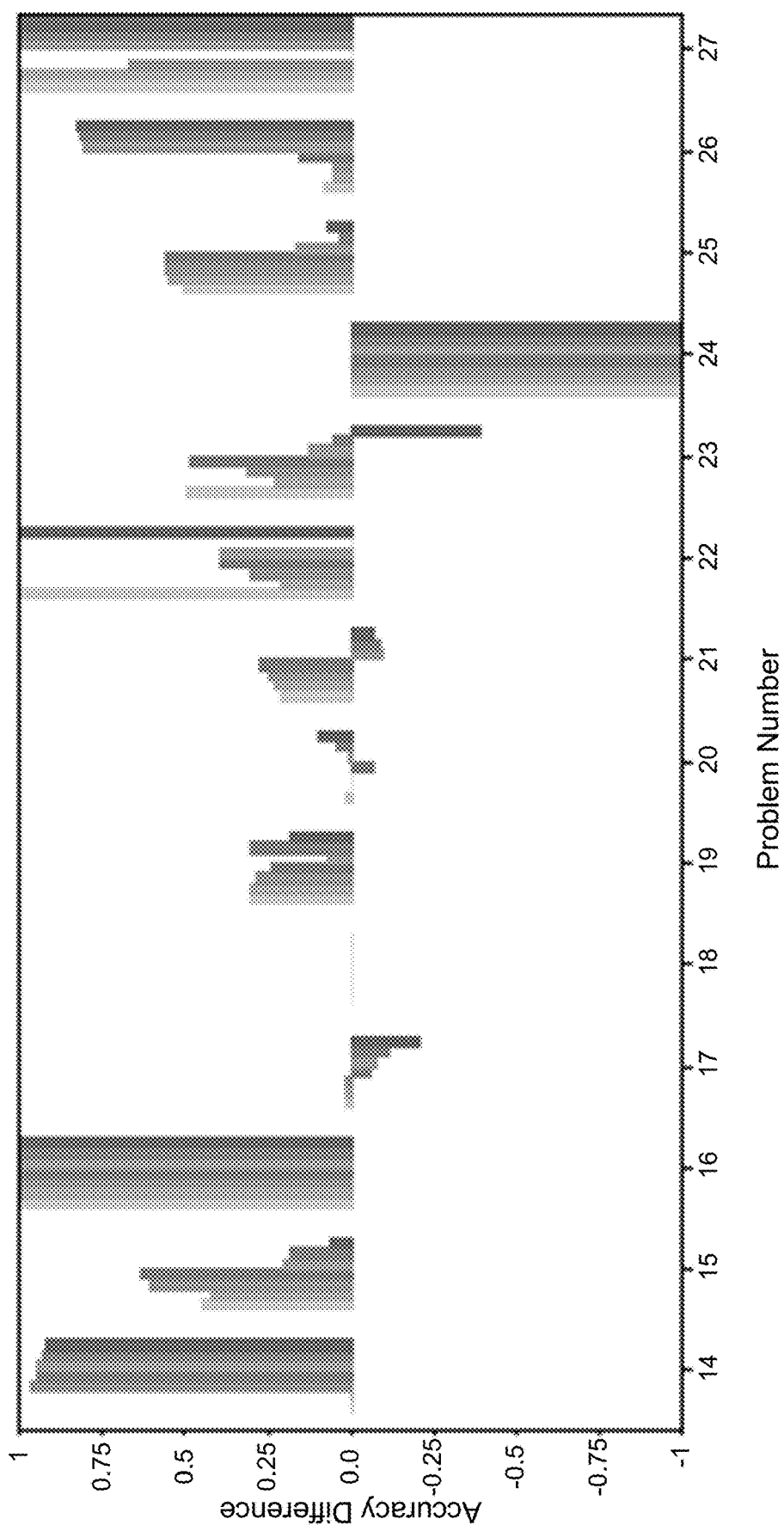
Figure 7C:
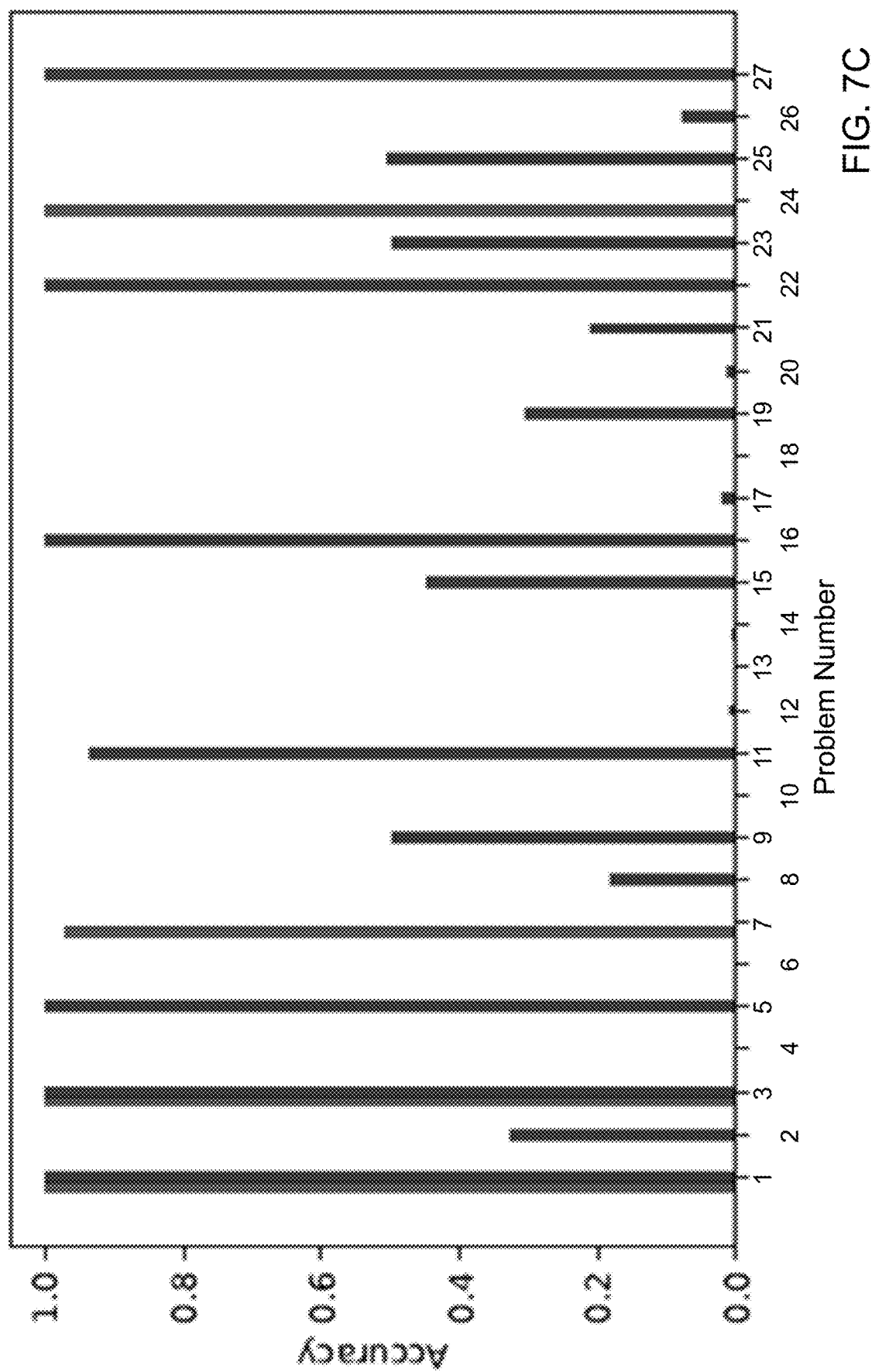
Figure 7E:
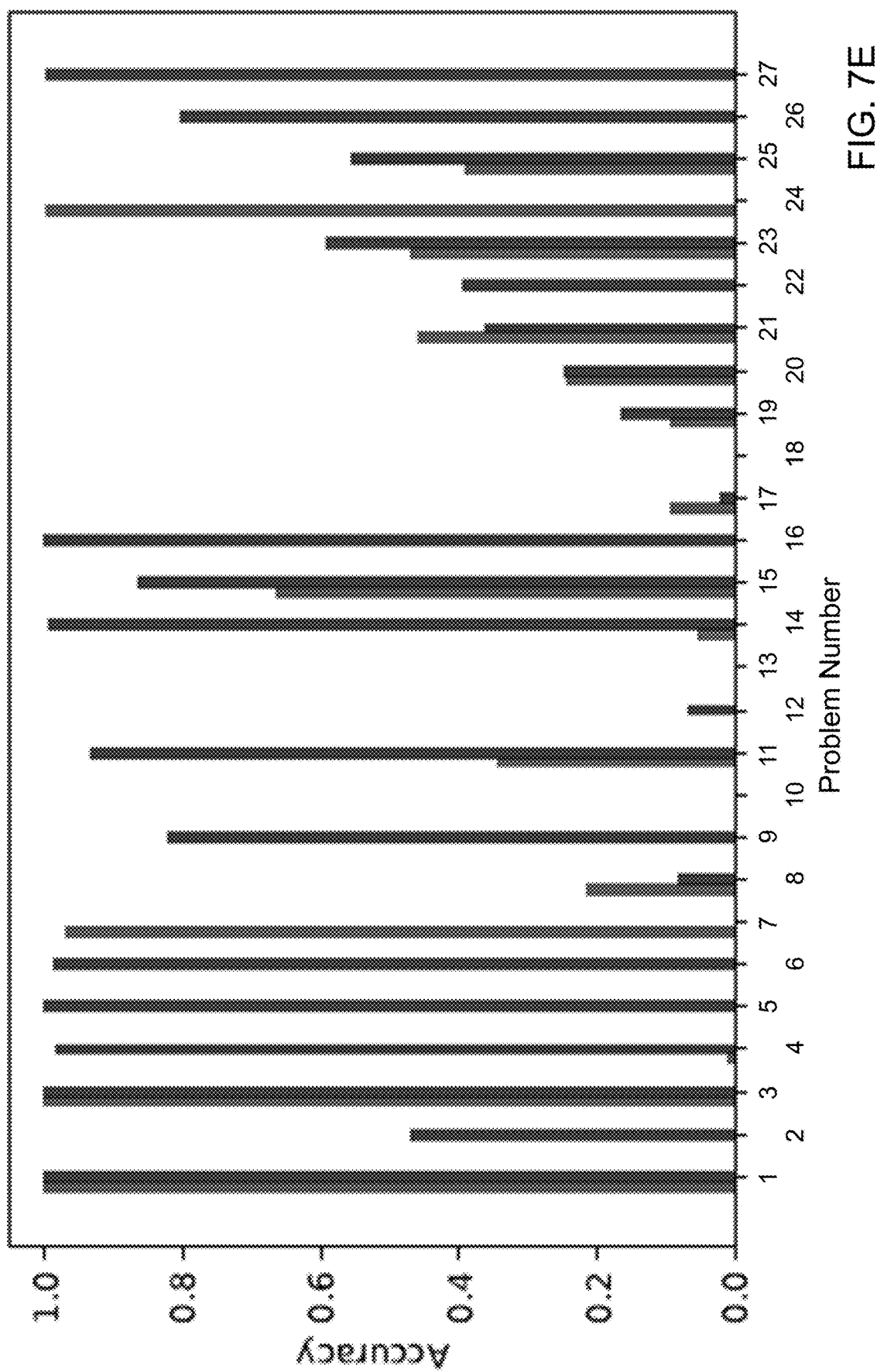
Figure 7F:
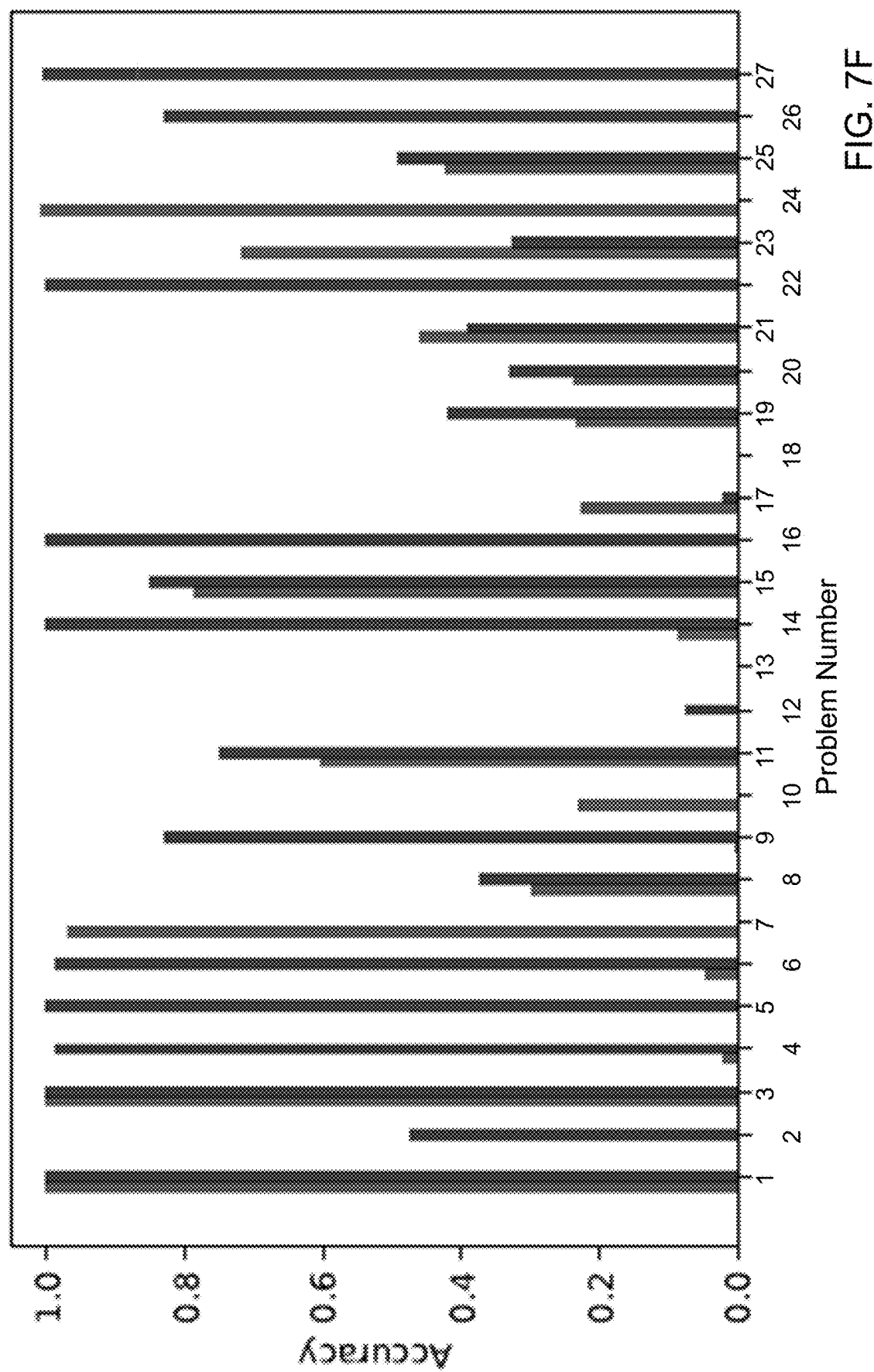

For each problem, seven different batch sizes were considered for training a simple neural network with a single hidden layer. The seven different batch sizes were $n_0=\{16, 32, 64, 128, N/10, N/8, N/4\}$ in an increasing order in most problems. Referring to FIGS. 7A and 7B, a difference between the training accuracy computed using neural network model training application 122 and the training accuracy computed using SGD is shown for each problem. A positive difference indicates that neural network model training application 122 performed better than SGD. The gray-scale variation of the bars associated with each problem distinguishes the different values of $n_0$ in 16, 32, 64, 128, N/10, N/8, N/4 order from left to right for each problem and as the gray-scale becomes darker.

Referring to FIGS. 7C, 7D, 7E, and 7F, the training accuracy computed using neural network model training application 122 and the training accuracy computed using SGD are shown for each problem $n_0=\{16, 64, N/10, N/4\}$, respectively. The bar aligned with each problem number shows the training accuracy using neural network model training application 122 whereas, the bar to the left of each aligned bar shows the training accuracy using the best tuned SGD. As also shown by FIGS. 7A and 7B, problem numbers 7 and 24 were the only problems for which SGD performed better for all batch sizes. Problem numbers 1, 3, 10, 13, and 18 resulted in very similar performance between neural network model training application 122 and SGD. Neural network model training application 122 performed better than SGD for at least the smaller batch sizes for the remaining problem numbers. Smaller batch sizes utilize less memory.

Increasing the batch size generally improved the training accuracy of each model at least partly due to the fact that the ratio of infrequent classes to frequent ones is large. As a result, increasing the batch size increases the chance of capturing a rare event in the batch leading to better accuracy. Neural network model training application 122 was less susceptible to this issue as compared to SGD due to its better accuracy even using small batch sizes.

Neural network model training application 122 addresses issues related to noise features that arise when using the minibatch approach to deep learning problems. Neural network model training application 122 controls for stochasticity and better adapts to minibatch processing in large scale optimization. Neural network model training application 122 uses a progressive trust-region radius update, batch evaluation instead of entire dataset evaluation to select gradient batch size, and a restart strategy when model accuracy deteriorates. The numerical results show that neural network model training application 122 improves the results from L-SSR1-TR and provides better results compared to SGD in imbalanced datasets. Moreover, neural network model training application 122 is robust to changes in hyperparameter values.

There are applications for neural network model training application 122 and prediction application 422 in many areas such as process control and equipment health monitoring, image processing and classification, data segmentation, data analysis, voice processing and recognition, language translation, etc. The presented results demonstrate improved significantly improved accuracies with fewer iterations resulting in significantly faster computing times to achieve comparable or better results. The explosion of digital data is generating many opportunities for big data analytics, which in turn provides many opportunities for training neural network models to capitalize on the information contained in the data—to make better predictions that lead to better decisions.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (A) randomly select observation vectors from a plurality of observation vectors, wherein a number of observation vectors selected is a mini-batch size value;
   (B) execute a forward and backward propagation of a neural network to compute a gradient vector and a weight vector using the selected observation vectors, wherein the neural network includes a layer type for each layer of a plurality of neural network layers;
   (C) compute a search direction vector using the gradient vector;
   (D) compute a step size value using a line search with an objective function value that indicates an error measure of the executed neural network given the weight vector, the step size value, and the computed search direction vector;
   (E) compute an updated weight vector as a function of the weight vector, the computed step size value, and the computed search direction vector;
   (F) based on a predefined progress check frequency value, randomly select second observation vectors from the plurality of observation vectors;
   compute a progress check objective function value given the weight vector, the step size value, the computed search direction vector, and the randomly selected second observation vectors; and
   based on an accuracy test performed using the objective function value and the computed progress check objective function value, update the mini-batch size value;
   (G) repeat (A) to (F) until a convergence parameter value indicates training of the neural network is complete, wherein the weight vector for a next iteration is the computed updated weight vector; and
   output the computed updated weight vector to describe a trained neural network model.

2. The non-transitory computer-readable medium of claim 1, wherein the accuracy test is performed based on $$\hat{f}(w_k) - \hat{f}_K \geq -\gamma_1 + \gamma_2 \sum_{j=k-K}^{k} R_j,$$

where $\hat{f}(w_k)$ is the objective function value, $w_k$ is the weight vector computed on a most recent iteration of (B), $\hat{f}_K$ is the progress check objective function value, $\gamma_1$ is a first progress threshold, $\gamma_2$ is a second progress threshold, k is a current number of iterations of (B), K is the predefined progress check frequency value, $R_j = \hat{f}(w_j + p^*) - \hat{f}(w_j)$, $\hat{f}(w_j + p^*)$ is a second objective function value computed at $w_j + p^*$, $\hat{f}(w_j)$ is a third objective function value computed at $w_j$, $w_j$ is a weight vector computed at a $j^{th}$ iteration of (B), and $p^*$ is a first trust region parameter.

3. The non-transitory computer-readable medium of claim 2, wherein the mini-batch size value is updated when $$\hat{f}(w_k) - \hat{f}_K \geq -\gamma_1 + \gamma_2 \sum_{j=k-K}^{k} R_j.$$

4. The non-transitory computer-readable medium of claim 3, wherein the mini-batch size value is updated using $n_b = \min(2.0 n_b, N)$, where $n_b$ is the mini-batch size value, and N is a number of observation vectors included in the plurality of observation vectors.

5. The non-transitory computer-readable medium of claim 4, wherein, when $$\hat{f}(w_k) - \hat{f}_K \geq -\gamma_1 + \gamma_2 \sum_{j=k-K}^{k} R_j$$

and $n_b = N$, a progressive radius parameter $\zeta$ is set to zero.

6. The non-transitory computer-readable medium of claim 1, wherein a number of the selected second observation vectors is defined as $\hat{n} = \min(1.1 n_b, 5000)$, where $\hat{n}$ is the number of the selected second observation vectors, and $n_b$ is the mini-batch size value.

7. The non-transitory computer-readable medium of claim 1, wherein the convergence parameter value is a number of iterations of (G).

8. The non-transitory computer-readable medium of claim 1, wherein, after (G), the computer-readable instructions further cause the computing device to:
   read a new observation vector from a dataset;
   input the read new observation vector to the trained neural network model to predict a characteristic value of the read new observation vector; and
   output the predicted characteristic value.

9. The non-transitory computer-readable medium of claim 1, wherein computing the search direction vector comprises:
   computing a first trust region parameter; and
   computing a second trust region parameter using the computed gradient vector and the computed step size value,
   wherein the search direction vector is computed using the computed first trust region parameter and the computed second trust region parameter.

10. The non-transitory computer-readable medium of claim 9, wherein the second trust region parameter is computed using $v = \mu v - \eta \alpha_s g_k + (1-\eta)s$ followed by $v = \min(1, \delta/\|v\|)v$, where v is the second trust region parameter, µ is a predefined momentum parameter value, η is a predefined hybrid parameter value, $\alpha_s$ is the computed step size value, $g_k$ is the computed gradient vector, $s=\alpha_k p$, $\alpha_k$ is a step size value computed on a previous iteration of (D), and p is the search direction vector computed on a previous iteration of (C), δ is a trust-region radius value, and ‖ ‖ indicates a Euclidean norm.

11. The non-transitory computer-readable medium of claim 10, wherein the search direction vector is computed using $p=(1-\eta)p^*+\mu v$ followed by $p=\min(1, \delta/\|p\|)p$.

12. The non-transitory computer-readable medium of claim 10, wherein the line search is performed while $\hat{f}(w_k+\alpha_k p) \leq \hat{f}(w_k)+c_1\alpha_k g_k$ where $\hat{f}(w_k)$ is the objective function value, $w_k$ is the weight vector computed on a most recent iteration of (B), $c_1$ is a predefined control parameter value, and $\hat{f}(w_k+\alpha_k p)$ is a second objective function value computed at $w_k+\alpha_k p$.

13. The non-transitory computer-readable medium of claim 10, wherein after (C) and before (D), the computer-readable instructions further cause the computing device to reinitialize a Hessian matrix to an identity matrix when $$\min\left(|g_k^T p|, \frac{|g_k^T p|}{\|p\|_2}\right) < \xi\|g_k\|_2,$$

where ξ is a predefined test parameter value, $\| \|_2$ indicates an L2 norm, | | indicates an absolute value, and τ indicates a transpose, and to go to (B) after incrementing an iteration counter.

14. The non-transitory computer-readable medium of claim 1, wherein after (G) and before outputting the computed updated weight vector, the computer-readable instructions further cause the computing device to (H) execute the forward and backward propagation of the neural network to compute an overall gradient vector and the weight vector using the plurality of observation vectors.

15. The non-transitory computer-readable medium of claim 14, wherein after (H) and before outputting the computed updated weight vector, the computer-readable instructions further cause the computing device to repeat (A) to (H) until a second convergence parameter value computed using the computed overall gradient vector indicates training of the neural network is complete.

16. The non-transitory computer-readable medium of claim 1, wherein the convergence parameter value is computed using the computed gradient vector.

17. A computing device comprising:
a processor; and
a computer-readable medium operably coupled to the processor, the computer-readable medium having computer-readable instructions stored thereon that, when executed by the processor, cause the computing device to
(A) randomly select observation vectors from a plurality of observation vectors, wherein a number of observation vectors selected is a mini-batch size value;
(B) execute a forward and backward propagation of a neural network to compute a gradient vector and a weight vector using the selected observation vectors, wherein the neural network includes a layer type for each layer of a plurality of neural network layers;
(C) compute a search direction vector using the gradient vector;
(D) compute a step size value using a line search with an objective function value that indicates an error measure of the executed neural network given the weight vector, the step size value, and the computed search direction vector;
(E) compute an updated weight vector as a function of the weight vector, the computed step size value, and the computed search direction vector;
(F) based on a predefined progress check frequency value,
randomly select second observation vectors from the plurality of observation vectors;
compute a progress check objective function value given the weight vector, the step size value, the computed search direction vector, and the randomly selected second observation vectors; and
based on an accuracy test performed using the objective function value and the computed progress check objective function value, update the mini-batch size value;
(G) repeat (A) to (F) until a convergence parameter value indicates training of the neural network is complete, wherein the weight vector for a next iteration is the computed updated weight vector; and
output the computed updated weight vector to describe a trained neural network model.

18. A method of training a neural network model, the method comprising:
(A) randomly selecting, by a computing device, observation vectors from a plurality of observation vectors, wherein a number of observation vectors selected is a mini-batch size value;
(B) executing, by the computing device, a forward and backward propagation of a neural network to compute a gradient vector and a weight vector using the selected observation vectors, wherein the neural network includes a layer type for each layer of a plurality of neural network layers;
(C) computing, by the computing device, a search direction vector using the gradient vector;
(D) computing, by the computing device, a step size value using a line search with an objective function value that indicates an error measure of the executed neural network given the weight vector, the step size value, and the computed search direction vector;
(E) computing, by the computing device, an updated weight vector as a function of the weight vector, the computed step size value, and the computed search direction vector;
(F) based on a predefined progress check frequency value,
randomly selecting, by the computing device, second observation vectors from the plurality of observation vectors;
computing, by the computing device, a progress check objective function value given the weight vector, the step size value, the computed search direction vector, and the randomly selected second observation vectors; and
based on an accuracy test performed using the objective function value and the computed progress check objective function value, updating, by the computing device, the mini-batch size value;
(G) repeating, by the computing device, (A) to (F) until a convergence parameter value indicates training of the neural network is complete, wherein the weight vector for a next iteration is the computed updated weight vector; and outputting, by the computing device, the computed updated weight vector to describe a trained neural network model.

19. The method of claim 18, wherein the accuracy test is performed based on $$\hat{f}(w_k) - \hat{f}_K \geq -\gamma_1 + \gamma_2 \sum_{j=k-K}^{k} R_j,$$

where $\hat{f}(w_k)$ is the objective function value, $w_k$ is the weight vector computed on a most recent iteration of (B), $\hat{f}_K$ is the progress check objective function value, $\gamma_1$ is a first progress threshold, $\gamma_2$ is a second progress threshold, k is a current number of iterations of (B), K is the predefined progress check frequency value, $R_j = \hat{f}(w_j+p^*) - \hat{f}(w_j)$, $\hat{f}(w_j+p^*)$ is a second objective function value computed at $w_j+p^*$, $\hat{f}(w_j)$ is a third objective function value computed at $w_j$, $w_j$ is a weight vector computed at a $j^{th}$ iteration of (B), and $p^*$ is a first trust region parameter.

20. The method of claim 19, wherein the mini-batch size value is updated when $$\hat{f}(w_k) - \hat{f}_K \geq -\gamma_1 + \gamma_2 \sum_{j=k-K}^{k} R_j.$$

21. The method of claim 20, wherein the mini-batch size value is updated using $n_b = \min(2.0 n_b, N)$, where $n_b$ is the mini-batch size value, and N is a number of observation vectors included in the plurality of observation vectors.

22. The method of claim 21, wherein, when $$\hat{f}(w_k) - \hat{f}_K \geq -\gamma_1 + \gamma_2 \sum_{j=k-K}^{k} R_j$$

and $n_b = N$, a progressive radius parameter $\zeta$ is set to zero.

23. The method of claim 18, wherein a number of the selected second observation vectors is defined as $\hat{n} = \min(1.1 n_b, 5000)$, where $\hat{n}$ is the number of the selected second observation vectors, and $n_b$ is the mini-batch size value.

24. The method of claim 18, wherein the convergence parameter value is a number of iterations of (G).

25. The method of claim 18, wherein, after (G), further comprising:

reading, by the computing device, a new observation vector from a dataset;
inputting, by the computing device, the read new observation vector to the trained neural network model to predict a characteristic value of the read new observation vector; and
outputting, by the computing device, the predicted characteristic value.

26. The method of claim 18, wherein computing the search direction vector comprises:
computing a first trust region parameter; and
computing a second trust region parameter using the computed gradient vector and the computed step size value,
wherein the search direction vector is computed using the computed first trust region parameter and the computed second trust region parameter.

27. The method of claim 26, wherein the second trust region parameter is computed using $v = \mu v - \eta \alpha_s g_k + (1-\eta)s$ followed by $v = \min(1, \delta/\|v\|)v$, where v is the second trust region parameter, $\mu$ is a predefined momentum parameter value, $\eta$ is a predefined hybrid parameter value, $\alpha_s$ is the computed step size value, $g_k$ is the computed gradient vector, $s = \alpha_k p$, $\alpha_k$ is a step size value computed on a previous iteration of (D), and p is the search direction vector computed on a previous iteration of (C), $\delta$ is a trust-region radius value, and $\|\ \|$ indicates a Euclidean norm.

28. The method of claim 26, wherein the search direction vector is computed using $p = (1-\eta)p^* + \mu v$ followed by $p = \min(1, \delta/\|p\|)p$.

29. The method of claim 26, wherein the line search is performed while $\hat{f}(w_k + \alpha_k p) \leq \hat{f}_k + c_1 \alpha_k g_k$ where $\hat{f}(w_k)$ is the objective function value, $w_k$ is the weight vector computed on a most recent iteration of (B), $c_1$ is a predefined control parameter value, and $\hat{f}(w_k + \alpha_k p)$ is a second objective function value computed at $w_k + \alpha_k p$.

30. The method of claim 26, wherein after (C) and before (D), further comprising reinitializing, by the computing device, a Hessian matrix to an identity matrix when $$\min\left(|g_k^T p|, \frac{|g_k^T p|}{\|p\|_2}\right) < \xi \|g_k\|_2,$$

where is a predefined test parameter value, $\|\ \|_2$ indicates an L2 norm, $|\ |$ indicates an absolute value, and $\tau$ indicates a transpose, and to go to (B) after incrementing an iteration counter.

* * * * *

UNITED STATES PATENT AND TRADEMARK OFFICE
CERTIFICATE OF CORRECTION

PATENT NO. : 10,949,747 B1
APPLICATION NO. : 16/950145
DATED : March 16, 2021
INVENTOR(S) : Majid Jahani et al.

Page 1 of 3

It is certified that error appears in the above-identified patent and that said Letters Patent is hereby corrected as shown below:

In the Specification

Column 3, Line 3:
Delete the phrase "$\cup\{W_i,\beta_i\}_{i=1}^{b}$" and replace with --$\cup\{W_i, \beta_i\}_{i=1}^{l}$--.

Column 3, Line 56:
Delete the phrase "$w_{k+1} = w_k - \alpha_k D_k g\mathcal{J}(w_k)$" and replace with --$w_{k+1} = w_k - \alpha_k D_k g_\mathcal{J}(w_k)$--.

Column 3, Line 60:
Delete the phrase "$g\mathcal{J}(w_k)$" and replace with --$g_\mathcal{J}(w_k)$--.

Column 13, Line 57:
Delete the phrase "convergence criterion value $\in$" and replace with --convergence criterion value $\epsilon$--.

Column 13, Lines 59-60:
Delete the phrase "convergence criterion value $\in$ may be $\in$ = 1.0$e$ – 8" and replace with --convergence criterion value $\epsilon$ may be $\epsilon$ = 1.0$e$ – 8--.

Column 13, Line 65:
Delete the phrase "convergence criterion value E" and replace with --convergence criterion value $\epsilon$--.

Column 14, Line 7:
Delete the phrase "$n_0 = n_0$" and replace with --$n_b = n_0$--.

Column 14, Line 50:
Delete the phrase "where $\tau$ indicates a transpose," and replace with --where T indicates a transpose,--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,949,747 B1

Column 15, Line 17:
Delete the phrase "$s_k^T(y_k - B_k s_k) \neq 0$," and replace with --$s_k^T(y_k - B_k s_k) \neq 0,$--.

Column 15, Line 20:
Delete the phrase "$y_k^T s_k$," and replace with --$y_k^T s_k$,--.

Column 15, Line 65:
Delete the phrase "$p^\tau g_k > 0$. When $p^\tau g_k > 0$," and replace with --$p^\mathsf{T} g_k > 0$. When $p^\mathsf{T} g_k > 0$,--.

Column 15, Line 66:
Delete the phrase "$p^\tau g_k \leq 0$," and replace with --$p^\mathsf{T} g_k \leq 0$,--.

Column 16, Line 9:
Delete the phrase "$\min\left(|g_k^\mathsf{T} p|, \frac{|g_k^\mathsf{T} p|}{\|p\|_2}\right) < \xi \|g\|_2$," and replace with --$\min\left(|g_k^\mathsf{T} p|, \frac{|g_k^\mathsf{T} p|}{\|p\|_2}\right) < \xi \|g_k\|_2$,--.

Column 16, Line 23:
Delete the phrase "$\min\left(|g_k^\mathsf{T} p|, \frac{|g_k^\mathsf{T} p|}{\|p\|_2}\right) < \xi \|g_k\|_2$," and replace with --$\min\left(|g_k^\mathsf{T} p|, \frac{|g_k^\mathsf{T} p|}{\|p\|_2}\right) \geq \xi \|g_k\|_2$,--.

Column 16, Line 34:
Delete the phrase "$\alpha_k = a_0$." and replace with --$\alpha_k = \alpha_0$.--.

Column 17, Lines 5-6:
Delete the phrase "whether $\|g_k\| \leq \in$. When $\|g_k\| \leq \in$, processing continues in an operation 241. When $\|g_k\| > \in$," and replace with --whether $\|g_k\| \leq \epsilon$. When $\|g_k\| \leq \epsilon$, processing continues in an operation 241. When $\|g_k\| > \epsilon$,--.

Column 17, Lines 13-14:
Delete the phrase "whether $\|g_k'\| \leq \in$. When $\|g_k'\| \leq \in$, processing continues in an operation 243. When $\|g_k'\| > \in$," and replace with --whether $\|g_k'\| \leq \epsilon$. When $\|g_k'\| \leq \epsilon$, processing continues in an operation 243. When $\|g_k'\| > \epsilon$,--.

Column 17, Line 25:
Delete the phrase "$\hat{\rho} = \zeta T \hat{\rho} + \hat{\rho}$" and replace with --$\hat{\rho} = \zeta T \hat{\rho} + \rho$--.

CERTIFICATE OF CORRECTION (continued)
U.S. Pat. No. 10,949,747 B1

Column 17, Line 50:
Delete the phrase "When $\hat{m}\#m$," and replace with --When $\hat{m} \neq m$,--.

Column 17, Line 67:
Delete the phrase "When $\hat{m}\#0$," and replace with --When $\hat{m} \neq 0$,--.

In the Claims

Claim 13, Column 29, Lines 30-31:
Delete the phrase "$\tau$ indicates a transpose," and replace with --T indicates a transpose,--.

Claim 29, Column 32, Line 32:
Delete the phrase "$f(w_k + \alpha_k p) \leq f_k + c_1 \alpha_k g_k$" and replace with --$\hat{f}(w_k + \alpha_k p) \leq \hat{f}(w_k) + c_1 \alpha_k g_k$--.

Claim 30, Column 32, Line 46:
Delete the phrase "where is a predefined test parameter value," and replace with --where $\xi$ is a predefined test parameter value,--.

Claim 30, Column 32, Lines 47-48:
Delete the phrase "and $\tau$ indicates a transpose," and replace with --and T indicates a transpose,--.